United States Patent [19]
Naiki et al.

[11] Patent Number: 6,157,478
[45] Date of Patent: Dec. 5, 2000

[54] MULTIBEAM SCANNING OPTICAL APPARATUS AND LASER LIGHT SOURCE APPARATUS

[75] Inventors: Toshio Naiki, Toyokawa; Nobuo Kanai, Toyohashi; Jun Kohsaka, Toyokawa; Kenji Takeshita, Aichi-Ken, all of Japan

[73] Assignee: Minolta Co., Ltd., Osaka, Japan

[21] Appl. No.: 08/773,644

[22] Filed: Dec. 24, 1996

[30] Foreign Application Priority Data

Dec. 27, 1995 [JP] Japan .................................... 7-340998

[51] Int. Cl.⁷ .................................................. G02B 26/08
[52] U.S. Cl. ............................ 359/204; 359/216; 347/243
[58] Field of Search ............................ 359/204, 216–219, 359/629; 347/134, 233, 238, 241, 243, 244

[56] References Cited

U.S. PATENT DOCUMENTS 4,796,961  1/1989  Yamada et al. .
4,911,532  3/1990  Hidaka .

*Primary Examiner*—James Phan
*Attorney, Agent, or Firm*—Price and Gess

[57] ABSTRACT

In a multibeam scanning optical apparatus of a type where two parallel lines are simultaneously scanned by two laser beams irradiated from two semiconductor lasers, stable images are formed on the scanned surface by the two laser beams and the cost is reduced. The two laser beams irradiated from the two semiconductor lasers are directed substantially in the same direction through a beam splitter and then shaped by a condenser lens into two luminous fluxes whose optical axes are substantially parallel to each other. In another arrangement, the semiconductor lasers are directly secured to a surface of the beam splitter by use of an ultraviolet setting resin.

15 Claims, 19 Drawing Sheets

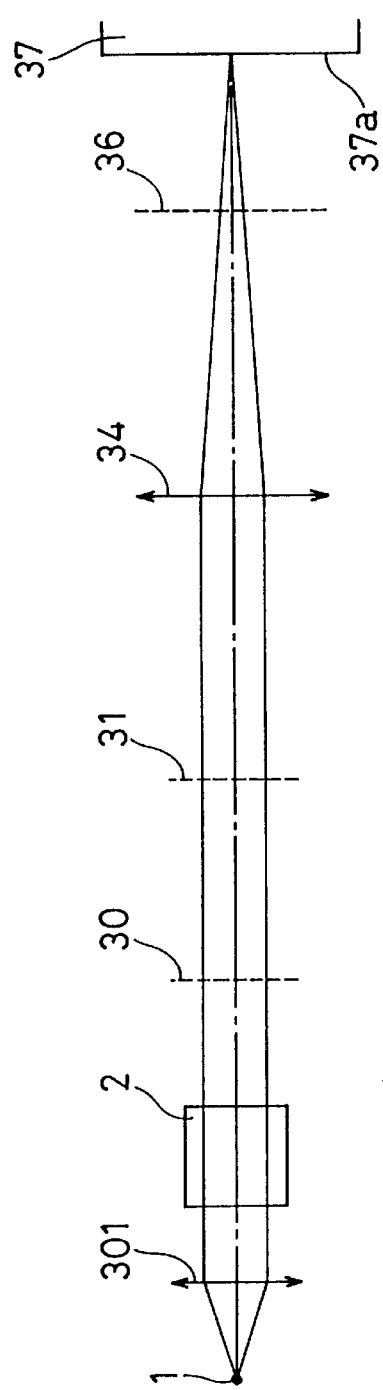
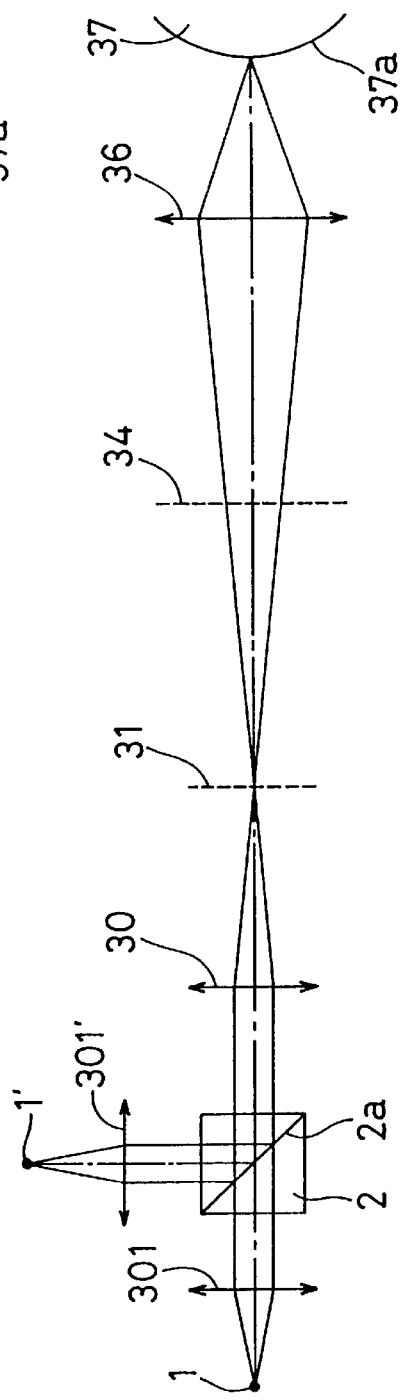
FIG. 1A PRIOR ART
FIG. 1B PRIOR ART

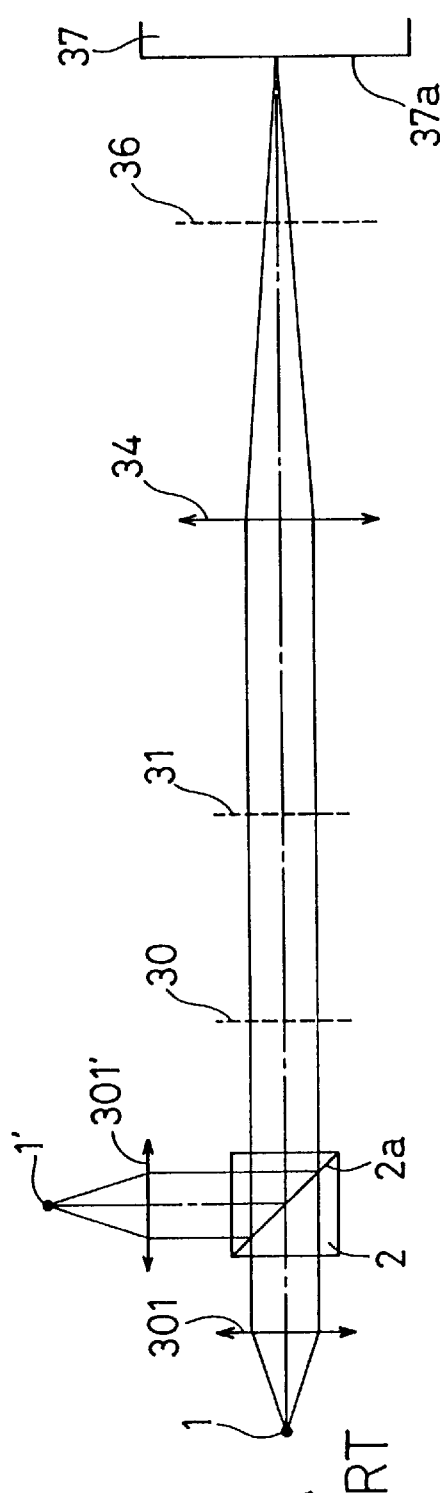
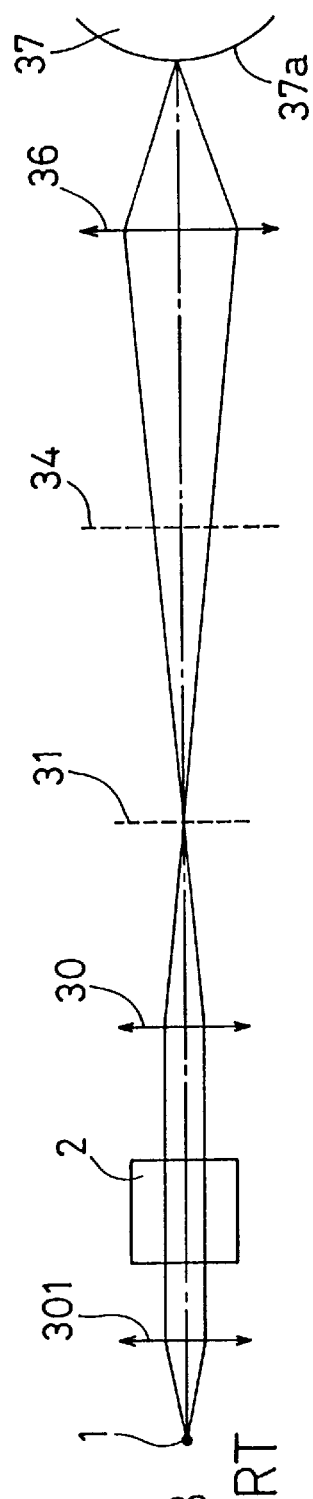
FIG. 3A PRIOR ART
FIG. 3B PRIOR ART

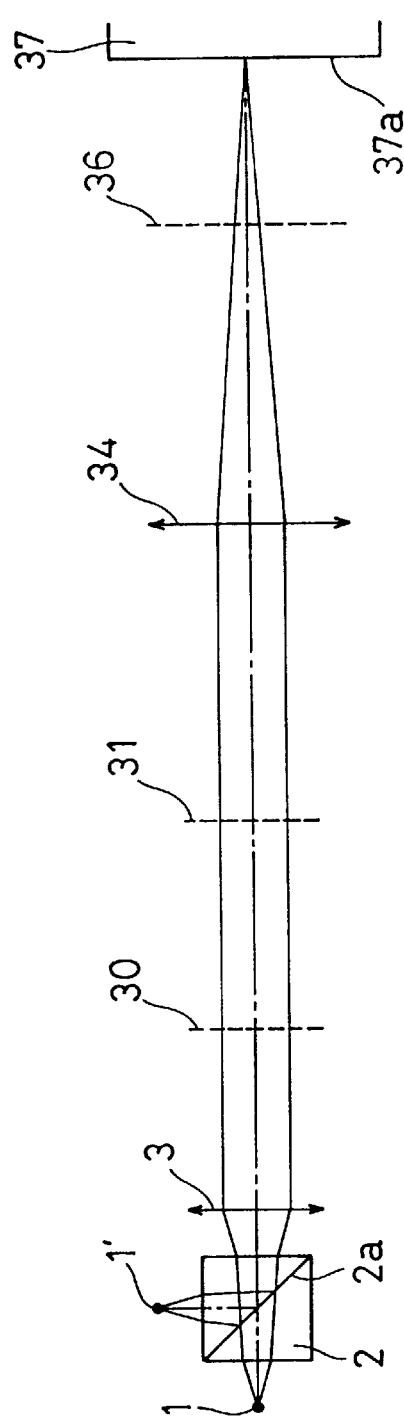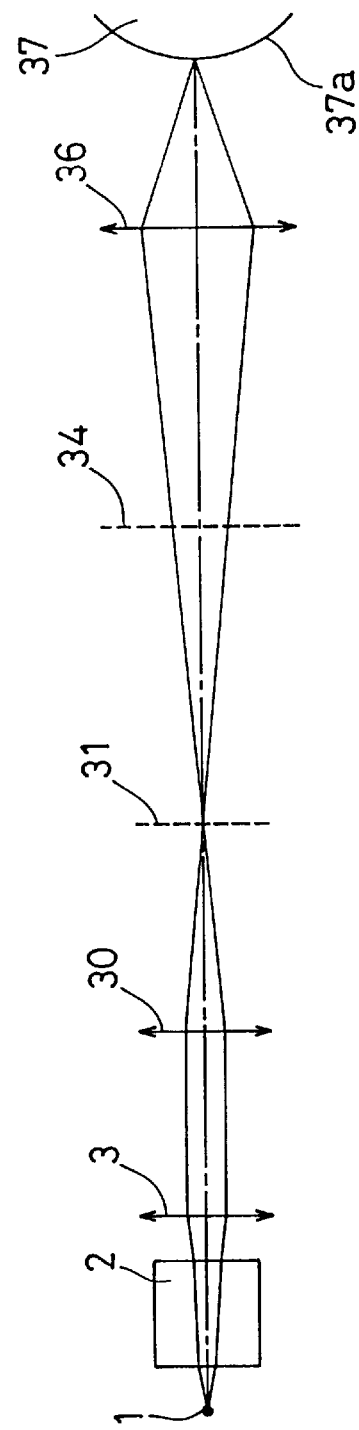

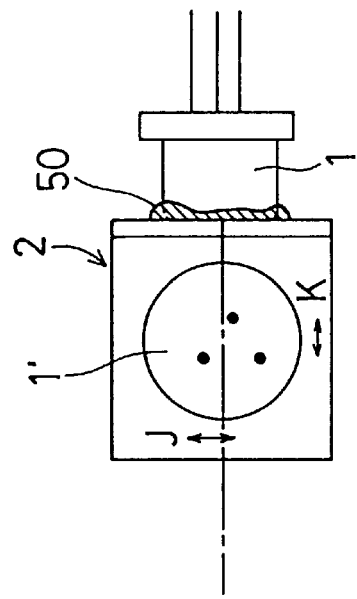
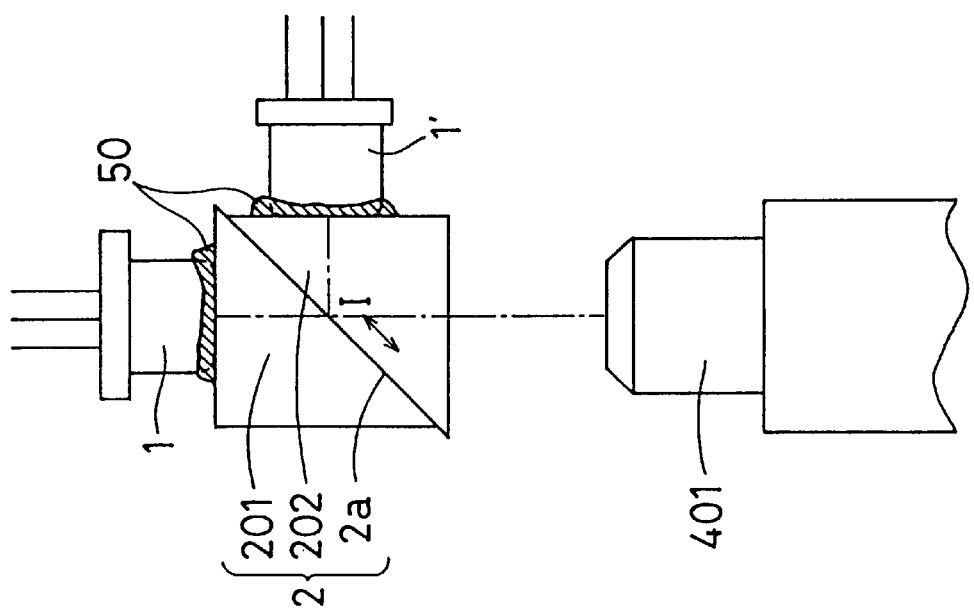

MULTIBEAM SCANNING OPTICAL APPARATUS AND LASER LIGHT SOURCE APPARATUS

BACKGROUND OF THE INVENTION

1. Field of the Invention

The present invention relates to a laser beam scanning optical apparatus used as a writing optical system for use in a laser beam printer (LBP) and a digital plain paper copier (PPC) and to a light source apparatus for use in the scanning optical apparatus, and more particularly, to a multibeam scanning optical apparatus, for simultaneously scanning a plurality of lines in parallel by use of a plurality of laser beams and to a laser light source apparatus for use in the multibeam scanning optical apparatus.

2. Description of the Prior Art

Conventionally, in the field of laser beam scanning optical apparatus, multibeam scanning optical apparatuses have been developed where a plurality of scanning lines are simultaneously scanned by use of a plurality of laser beams to substantially increase the speed of image formation substantially with the same number of rotations of the deflector, i.e. with the same speed of scanning in the main scanning direction and where a plurality of laser beams successively scan the same single scanning line to increase the density of images formed on the surface to be scanned (hereinafter, referred to as scanned surface).

In recent years, to meet the demand for laser beam scanning optical apparatuses to form high-resolution images, another type of multibeam scanning optical apparatus has been developed where by using a plurality of laser beams, the distances between the scanning lines are reduced to be shorter than those of an apparatus using a single laser beam so that images of higher resolution are formed substantially at the same speed.

There is a prior art of the multibeam scanning optical apparatus (hereinafter, referred to as first prior art) where a plurality of laser beams irradiated from a plurality of semiconductor lasers are shaped through a beam splitter into a plurality of luminous fluxes whose optical axes are close to one another and which advance in the same direction, and the luminous fluxes are directed to the scanned surface to simultaneously scan a plurality of scanning lines.

FIG. 5 shows a schematic arrangement of the first prior art which is provided with two semiconductor lasers 1 and 1' as the plurality of semiconductor lasers. In this arrangement, the semiconductor laser 1' irradiating a laser beam reflected by a beam splitter 2 is typically disposed in either of a position A such that the laser beam is incident on the beam splitter 2 from the sub scanning direction and a position B such that the laser beam is incident on the beam splitter 2 from within the main scanning plane.

The laser beam irradiated from the semiconductor laser 1 is shaped into a parallel luminous flux by a condenser lens 301 and then, transmitted by the beam splitter 2 without changing its direction. On the other hand, whether the semiconductor laser 1' is disposed in the position A or in the position B, the laser beam irradiated therefrom is shaped into a parallel luminous flux by a condenser lens 301' and then, incident on the beam splitter 2 to be reflected by an interference film (not shown) provided in the beam splitter 2, so that its direction is the same as that of the laser beam transmitted by the beam splitter 2.

In FIG. 5, the two laser beams are depicted such that their optical axes coincide with each other after having exited from the beam splitter 2. In actuality, however, the optical axes are two substantially parallel lines which are close to each other. The two laser beams are directed along substantially the same optical path to the scanned surface provided on a photoreceptor drum 37, where they are imaged into two spots with a predetermined distance therebetween in the sub scanning direction to thereby scan two scanning lines simultaneously.

For that purpose, the following elements are disposed on the optical path along which the two laser beams having exited from the beam splitter 2 are directed: a polygonal mirror 31 deflecting the two laser beams in the main scanning direction at a uniform angular velocity; an fθ lens 34 for causing the laser beams deflected by the polygonal mirror 31 to scan the scanned surface at a uniform speed; and first and second cylindrical lens units 30 and 36 which cooperatively correct an inclination of the deflecting surface of the polygonal mirror 31.

There is another prior art of the multibeam scanning optical apparatus (hereinafter, referred to as second prior art) where as shown in FIG. 6, an array-form semiconductor laser 101 is used as the light source. In this arrangement, a plurality of laser beams irradiated from array elements 101a, 101b and 101c are directed to the scanned surface and imaged into different spots by a scanning optical system similar to that of the above-described first prior art, so that a plurality of lines are scanned simultaneously.

Problems faced by the prior arts will be described. In the multibeam scanning optical apparatus according to the first prior art, even if the relative positions of the two spots into which the two laser beams are imaged on the scanned surface are initially adjusted, the relative positions of the semiconductor lasers 1 and 1', the condenser lenses 301 and 301' and the beam splitter 2 sometimes shift due to stress received when the optical elements are mounted in the apparatus body and thermal expansion caused by a temperature change. When this happens, angle errors are caused in the irradiation directions of the laser beams. As a result, the relative positions of the two spots into which the laser beams are imaged on the scanned surface shift over time.

If the relative positions of the two spots into which the two laser beams are imaged on the scanned surface shift in the main scanning direction or in the sub scanning direction, non-uniformity is caused in the main scanning direction at the start points of the scanning lines, or non-uniformity in the pitches of the scanning lines is caused in the sub scanning direction, so that the image quality deteriorates.

Especially in the first prior art, since the condenser lenses 301 and 301' are disposed between the semiconductor lasers 1 and 1' and the beam splitter 2 as shown in FIG. 5, if the positions of the semiconductor lasers 1 and 1' held integrally with the condenser lenses 301 and 301' shift relative to the position of the beam splitter 2, the relative positions of the two spots simultaneously formed on the scanned surface greatly shift.

In the multibeam scanning optical apparatus according to the second prior art shown in FIG. 6, where each of the array elements 101a, 101b and 101c constituting the semiconductor laser array 101 generates heat, if the heat is mutually transmitted, the temperatures of the array elements are affected by the heat, so that the wavelengths and quantities of the laser beams irradiated by the array elements 101a, 101b and 101c vary.

To avoid this problem, it is necessary to increase the distances between the array elements 101a, 101b and 101c. To do so, however, it is necessary to reduce the overall magnification of the optical system. If the magnification is reduced, the focal length of the scanning lens is reduced. Then, only a small space is left for disposing optical elements such as the polygonal mirror. Thus, such an arrangement is impractical.

SUMMARY OF THE INVENTION

An object of the present invention is to provide a laser light source apparatus forming stable images where the irradiation directions of a plurality of laser beams do not readily vary, and a multibeam scanning optical apparatus where by providing the light source apparatus, the relative positions of the scanning lines formed on the scanned surface by the plurality of laser beams do not readily vary.

To achieve the above-mentioned object, according to the present invention, a scanning optical apparatus having a first light source for irradiating a first luminous flux and a second light source for irradiating a second luminous flux, the first and second luminous fluxes being deflected by a deflector to scan a scanned surface, is provided with a beam splitter for transmitting the first luminous flux irradiated from the first light source and reflecting the second luminous flux irradiated from the second light source, a condenser lens for shaping the first and second luminous fluxes having exited from the beam splitter into parallel luminous fluxes, and a scanning optical system for imaging on the scanned surface the first and second luminous fluxes having shaped into parallel luminous fluxes by the condenser lens. The scanning optical apparatus fulfills the following condition:

$$d \cdot \beta \cdot Pi < 40000$$

where d is an optical path length in millimeters from an irradiation point of the second light source to a reflection point of the beam splitter, β is an overall magnification of the optical system from the irradiation point of the second light source to the scanned surface, and Pi is a density per inch representing the number of luminous fluxes imaged on the scanned surface.

According to this arrangement, the first luminous flux and the second luminous flux irradiated from the first light source and the second light source disposed in different positions are directed substantially in the same direction through the beam splitter and advances substantially along the same optical path thereafter, so that the condenser lens and the scanning optical system are common to the first and second luminous fluxes. Moreover, the shift amounts of the imaged position of the second luminous flux and the imaged position of the first luminous flux on the scanned surface are extremely small because the above-described condition is fulfilled.

In the above-described arrangement, the first light source, the second light source, the beam splitter and the condenser lens may be secured to the same holding member. Even if temperature changes, the resultant change of the relative positions of the light sources, the beam splitter and the condenser lens secured to the same holding member is slight, so that the relative positional relationship does not largely differ between the imaged position of the second luminous flux and the imaged position of the first luminous flux on the scanned surface.

Moreover, according to the present invention, a laser light source is provided with a beam splitter comprising a first optical device and a second optical device cemented at one surfaces thereof so that the cemented surfaces are semitransparent surfaces for transmitting light from the first optical device and reflecting light from the second optical device, a first laser light source secured to the first optical device for irradiating a laser beam toward the cemented surfaces, and a second laser light source secured to the second optical device for irradiating a laser beam toward the cemented surfaces. The laser beam irradiated from the first laser light source and transmitted by the cemented surfaces and the laser beam irradiated from the second semiconductor laser and reflected by the cemented surfaces exit from the laser light source apparatus substantially in the same direction.

In the laser light source apparatus, the beam splitter serves as a holder for the first and second laser light sources as well as directs the two laser beams in the same direction. Since the change of relative positions of the laser light sources due to the heat generated by the irradiation of the laser beams is extremely small, the directions of the two laser beams hardly vary.

BRIEF DESCRIPTION OF THE DRAWINGS

This and other objects and features of this invention will become clear from the following description, taken in conjunction with the preferred embodiments with reference to the accompanied drawings in which:

FIG. 1A shows a main scanning direction cross section of a multibeam scanning optical system from two semiconductor lasers to a scanned surface provided on a photoreceptor drum in a case where the semiconductor laser which irradiates the laser beam reflected by a beam splitter is disposed within a sub scanning direction cross section in a first prior art;

FIG. 1B shows a sub scanning direction cross section of the multibeam scanning optical system of FIG. 1A;

FIG. 3A shows a main scanning direction cross section of a multibeam scanning optical system from the two semiconductor lasers to the scanned surface provided on the photoreceptor drum in a case where the semiconductor laser which irradiates the laser beam reflected by the beam splitter is disposed within the main scanning direction cross section in the first prior art;

FIG. 3B shows a sub scanning direction cross section of the multibeam scanning optical system of FIG. 3A;

FIG. 15A shows a main scanning direction cross section of the multibeam scanning optical system from the two semiconductor lasers to the scanned surface provided on the photoreceptor drum in a case where the semiconductor laser which irradiates the laser beam reflected by a beam splitter is disposed within the main scanning direction cross section in the first embodiment;

FIG. 15B shows a sub scanning direction cross section of the multibeam scanning optical system of FIG. 15A;

FIGS. 19A and 19B are views of assistance in explaining a manner of securing, after optical adjustments, the semiconductor lasers and the beam splitter included in the laser light source apparatus of FIG. 18.

DESCRIPTION OF THE PREFERRED EMBODIMENTS

Figure 5:
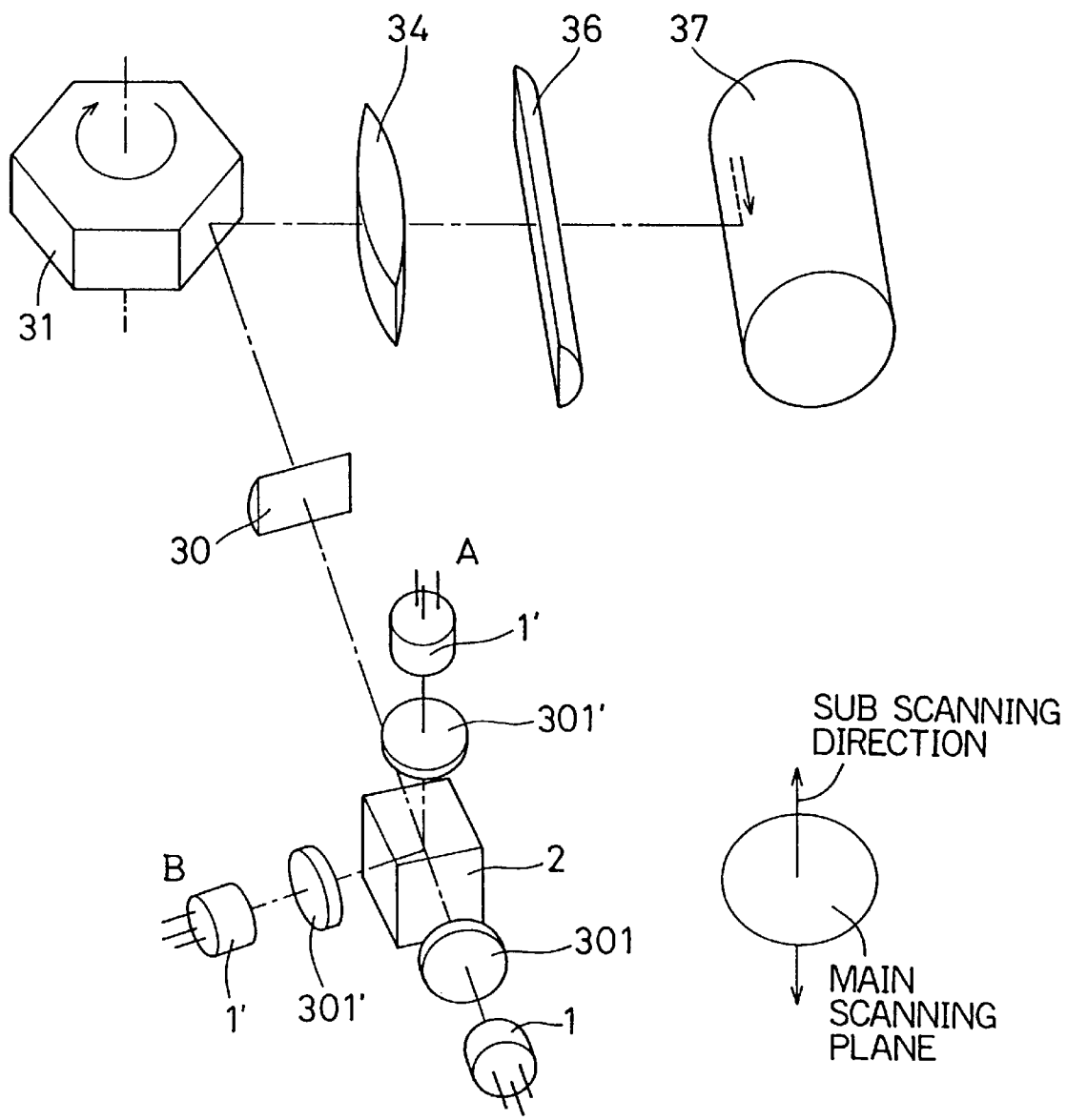
FIG. 5 is a perspective view showing a schematic arrangement of an optical system of the multibeam scanning optical apparatus according to the first prior art.
Figure 6:
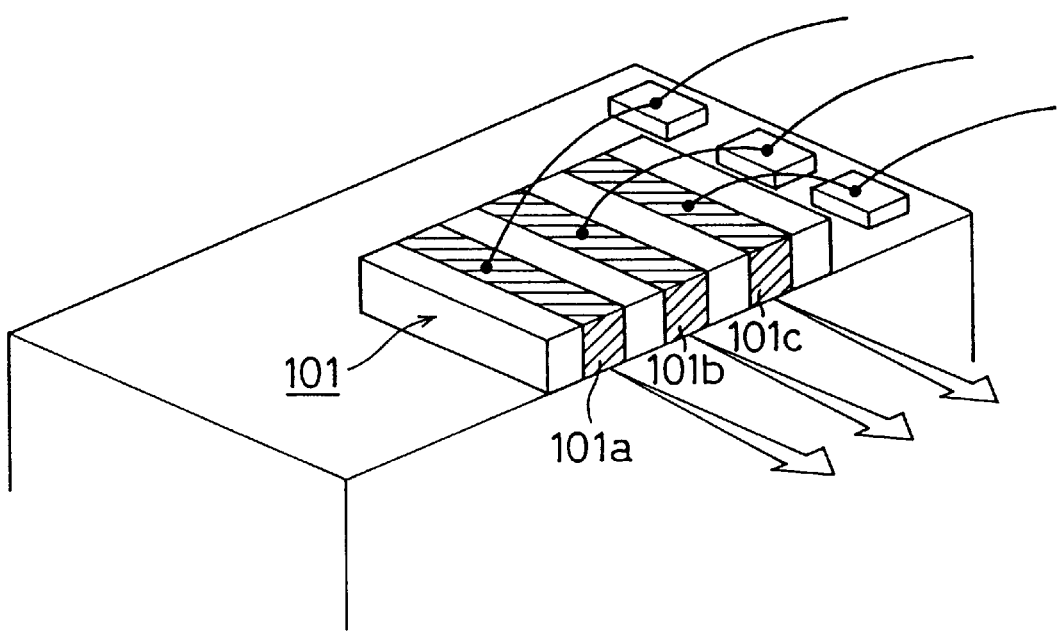
FIG. 6 is an external perspective view of an array-form semiconductor laser mounted in a multibeam scanning optical apparatus according to the second prior art.
Figure 7:
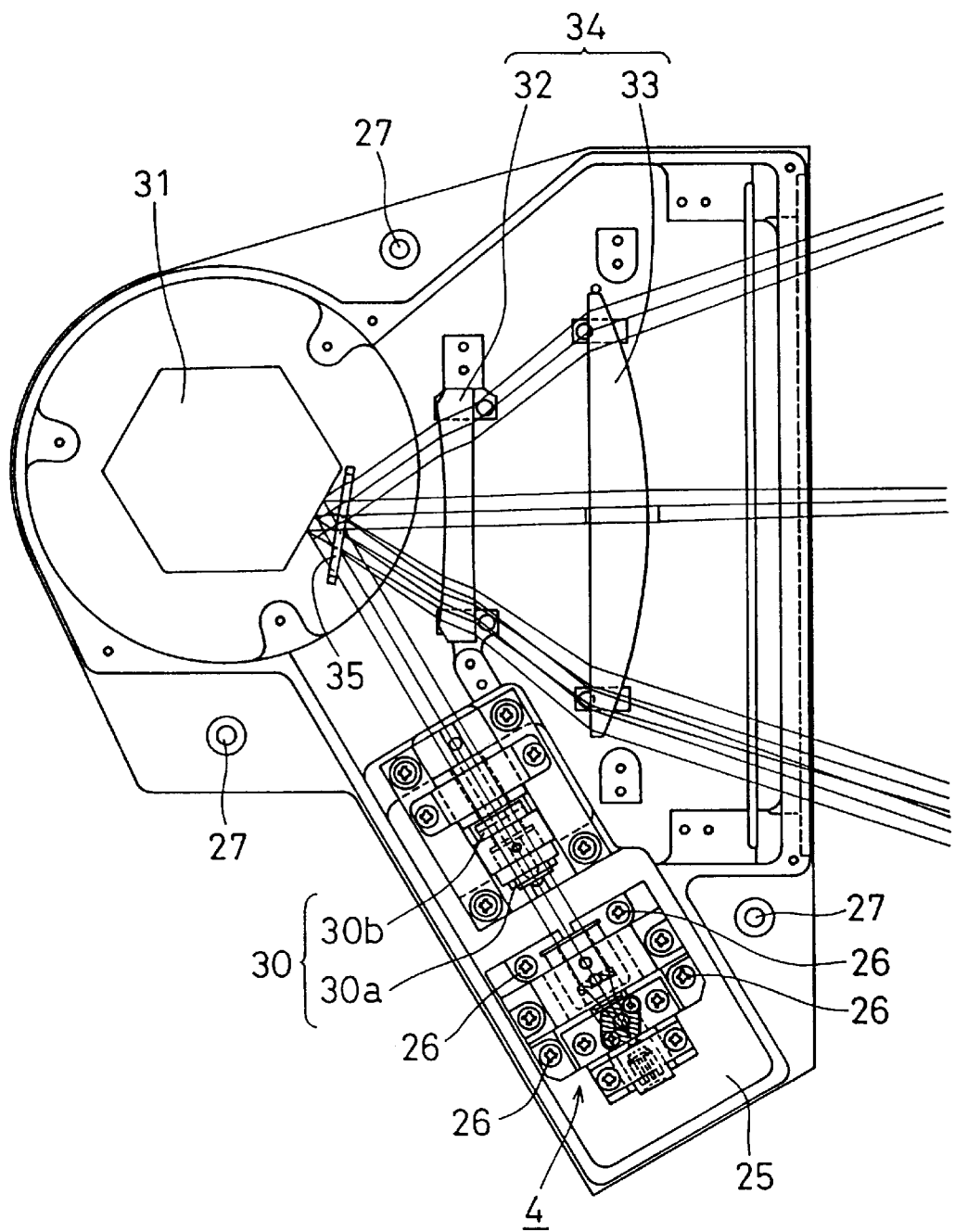
FIG. 7 is an upper view of a multibeam scanning optical apparatus according to a first embodiment of the present invention.
Figure 8:
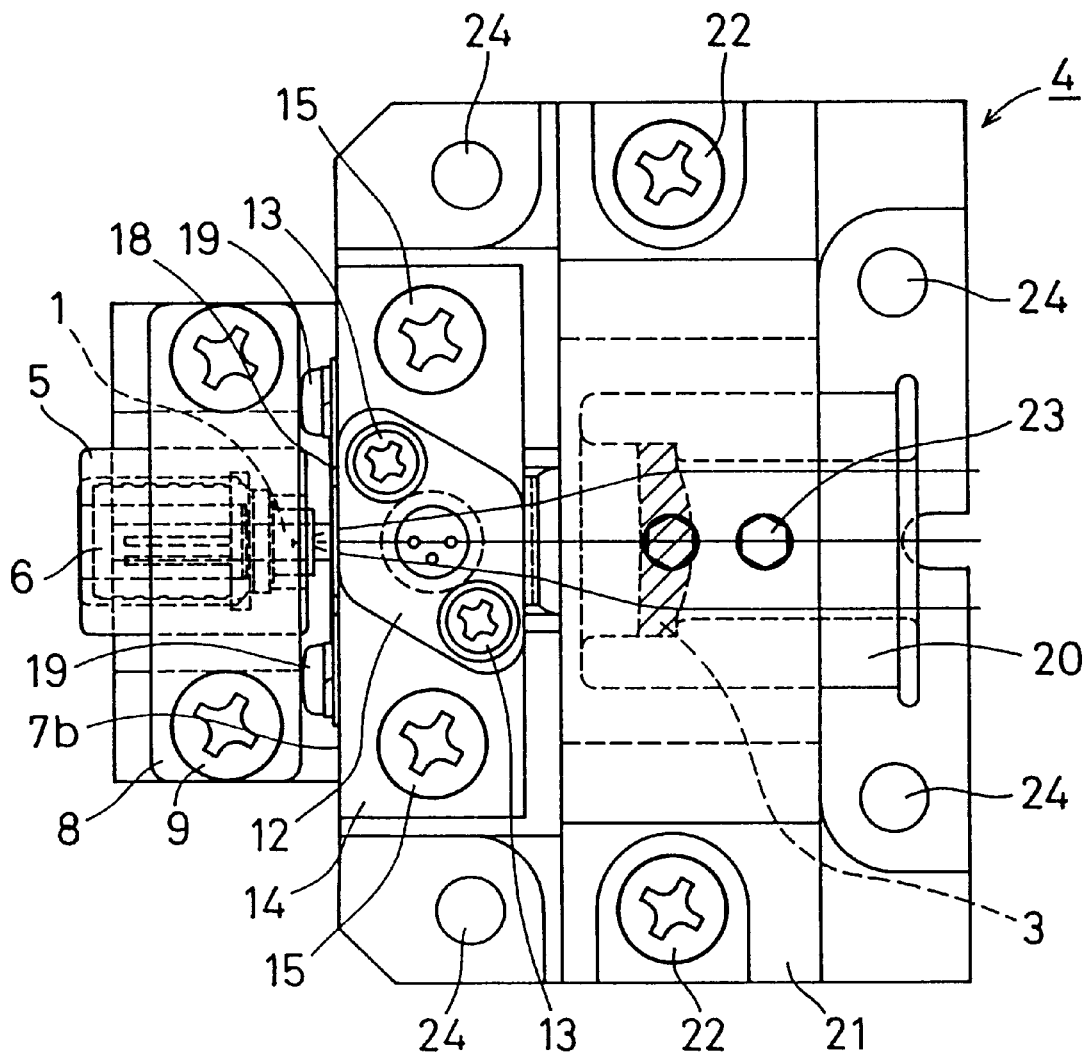
FIG. 8 is a partially enlarged view (upper view) of a laser light source apparatus mounted in the multibeam scanning optical apparatus of FIG. 7.
Figure 9:
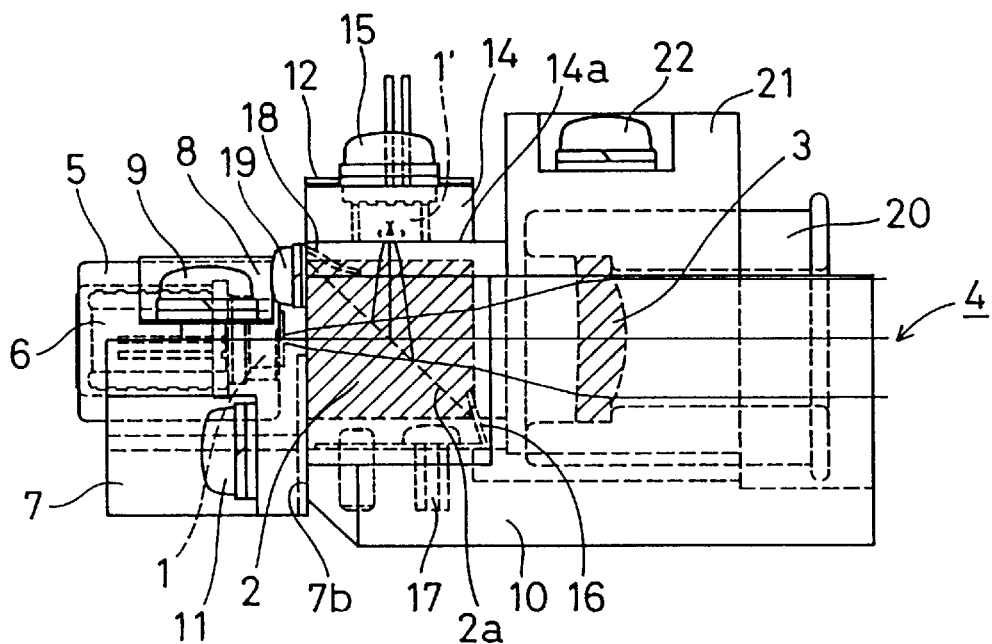
FIG. 9 is a partially enlarged view (side view) of the laser light source apparatus mounted in the multibeam scanning optical apparatus of FIG. 7.
Figure 10:
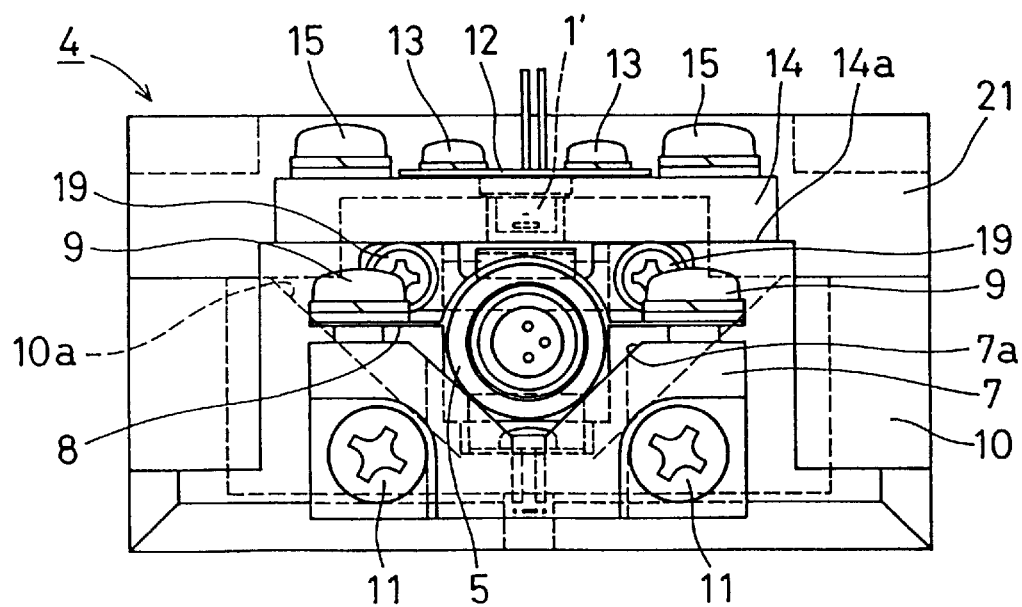
FIG. 10 is a partially enlarged view (rear view) of the laser light source apparatus mounted in the multibeam scanning optical apparatus of FIG. 7.
Figure 11:
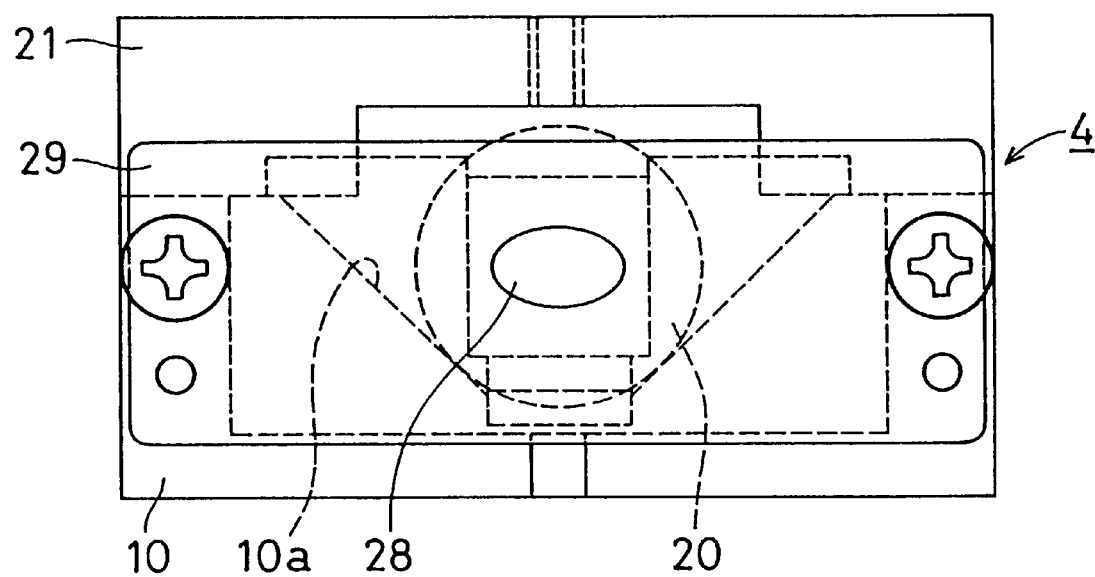
FIG. 11 is a partially enlarged view (front view) of the laser light source apparatus mounted in the multibeam scanning optical apparatus of FIG. 7.

Hereinafter, embodiments of a multibeam scanning optical apparatus according to the present invention and a laser light source apparatus mounted therein will be described with reference to the drawings. FIG. 7 is an upper view of a multibeam scanning optical apparatus according to a first embodiment of the present invention. FIGS. 8 to 11 are partially enlarged views of a laser light source apparatus 4 comprising semiconductor lasers 1 and 1', a beam splitter 2, a condenser lens 3, and a holder comprising a combination of members for securely holding the elements. FIG. 8 is an upper view, FIG. 9 is a side view, FIG. 10 is a rear view, and FIG. 11 is a front view. Elements having the same functions as those of the first prior art of FIG. 5 are designated as the same reference numerals.

Since the multibeam scanning optical apparatus is required to have a high accuracy and the high accuracy must be maintained over time, subsequently-described optical elements are mounted on a housing 25 having a high rigidity by use of screws 26. The housing 25 has a plurality of through holes 27 formed for screwing the multibeam scanning optical apparatus to the body of an apparatus such as a printer and a copier.

To secure the semiconductor laser 1 to a holding member 5, the semiconductor laser 1 is inserted into the holding member 5 being cylindrical and having its inner surface chased, and then, a cap member 6 having its outer surface threaded is screwed into the holding member 5. The holding member 5 is placed in a V-shaped groove 7a of a holding member 7 so as to be movable in the direction of the optical axis, and secured to the holding member 7 by use of a flat spring 8 and screws 9 after focus adjustment is made with respect to the semiconductor laser 1. The holding member 7 is joined to a base block 10 through a surface 7b vertical to the optical axis. After the semiconductor laser 1 is positioned in a direction along the surface 7b, the holding member 7 is secured to the base block 10 by use of screws 11.

The semiconductor laser 1' is secured to a holding member 14 by use of a flat spring 12 and screws 13. The holding member 14 is joined to a base block 10 through a surface 14a vertical to the optical axis of the laser beam from the semiconductor laser 1' to an interference film 2a of the beam splitter 2. After the semiconductor laser 1' is positioned in a direction along the surface 14a, the holding member 14 is secured to the base block 10 by use of screws 15.

The beam splitter 2 is secured to the base block 10 by use of a flat spring 16, a screw 17, a flat spring 18 and screws 19. The beam splitter 2 may be secured to the base block 10 by use of an adhesive.

In this arrangement, it is necessary that the two laser beams irradiated from the semiconductor lasers 1 and 1' should be, after having passed through the beam splitter 2, substantially parallel to each other with a predetermined distance therebetween in a vertical direction in FIG. 9, i.e. in the sub scanning direction. Therefore, the points where the optical axes intersect the interference film 2a of the beam splitter 2 slightly disagree within a plane parallel to the plane of FIG. 9.

On the exit surface side of the beam splitter 2, a condenser lens 3 is disposed which is held in a cylindrical lens barrel 20. In this arrangement, the lens barrel 20 is placed in a V-shaped groove 10a formed in the base block 10 so that the condenser lens 3 is movable in the direction of the optical axis. To the base block 10, a frame member 21 is attached by use of screws 22 so as to cover the lens barrel 20. After focus adjustment is made with respect to the condenser lens 3, the lens barrel 20 is secured to the base block 10 by use of screws 23 provided on the frame member 21.

In the base block 10, a plurality of through holes 24 are formed for inserting the screws 26 to secure the laser light source apparatus 4 to the housing 25. In order to shape the cross sections of the laser beams having exited from the condenser lens 3, an aperture restricting plate 29 having an aperture 28 of a predetermined shape is sometimes disposed in the vicinity of the beam exit of the lens barrel 20 where the condenser lens 3 is mounted.

In this arrangement, the laser beam irradiated from the semiconductor laser 1 is transmitted by the beam splitter 2 without changing its direction. The laser beam irradiated from the semiconductor laser 1' is reflected by the interference film 2a provided in the beam splitter 2, so that when it exits from the beam splitter 2, its direction is the same as that of the laser beam from the semiconductor laser 1.

After the two laser beams have exited from the beam splitter 2, their optical axes are two substantially parallel lines which are close to each other. The two laser beams are both shaped into parallel luminous fluxes by the condenser lens 3 and directed along substantially the same optical path to be imaged on a scanned surface (not shown) into two spots with a predetermined distance therebetween in the sub scanning direction.

The following elements are disposed on the optical path of the two laser beams between the condenser lens 3 and the scanned surface: a first cylindrical lens unit 30 including two cylindrical lenses 30a and 30b, a polygonal mirror 31 for simultaneously deflecting the two laser beams at a uniform angular velocity in the main scanning direction, an fθ lens unit 34 including two lenses 32 and 33 for causing the two laser beams deflected by the polygonal mirror 31 to scan the scanned surface at a uniform speed, and a second cylindrical lens unit (not shown).

The two cylindrical lenses 30a and 30b included in the first cylindrical lens unit 30 respectively have a positive power and a negative power only in the sub scanning direction. With these powers combined, the first cylindrical lens unit 30 has a positive power only in the sub scanning direction. For this reason, the two laser beams are condensed only in the sub scanning direction in the vicinity of the deflecting surface of the polygonal mirror 31 and their cross sections are constricted to be linear within the main scanning plane. The first cylindrical lens unit 30 is provided for correcting an inclination of the deflecting surface of the polygonal mirror 31 in cooperation with the second cylindrical lens unit having a positive power only in the sub scanning direction.

The two laser beams condensed by the first cylindrical lens unit 30 in the sub scanning direction in the vicinity of the deflecting surface of the polygonal mirror 31 are simultaneously deflected in the main scanning direction by a rotation of the deflecting surface of the polygonal mirror 31. The polygonal mirror 31 is of a regular polygonal prism form where its deflecting surface is constituted by a multiple of (six in FIG. 7) reflecting surfaces which are in parallel with the axis of rotation of the polygonal mirror 31. The polygonal mirror 31 rotates about the axis of rotation at a high speed at a uniform angular velocity by being driven by a motor (not shown) mounted on the rear surface of the housing 25.

To keep dust out, the polygonal mirror 31 is housed in a cover (not shown). The two laser beams incident on the deflecting surface of the polygonal mirror 31 and deflected by the surface pass through a glass window 35 formed on a side surface of the cover.

The two laser beams deflected by the deflecting surface of the polygonal mirror 31 are condensed in the main scanning direction by the fθ lens unit 34 including the two lenses 32 and 33 and having a positive power in the main scanning direction. Moreover, the two laser beams are condensed in the sub scanning direction by the second cylindrical lens unit having a positive power in the sub scanning direction and disposed between the fθ lens unit 34 and the scanned surface.

Consequently, the two laser beams are imaged on the scanned surface into two spots with a predetermined distance therebetween in the sub scanning direction to scan the scanned surface in the main scanning direction at a uniform speed so that the two spots simultaneously form two parallel scanning lines as the polygonal mirror 31 rotates. Scanning in the sub scanning direction is performed by a movement of the scanned surface.

In order to effectively use the laser beams irradiated from the semiconductor lasers 1 and 1' for image formation, it is desirable to increase the transmittance of the laser beam from the semiconductor 1 and the reflectance of the laser beam from the semiconductor laser 1' which laser beams are incident on the beam splitter 2.

To do so, in the first embodiment, semiconductor lasers which irradiate linearly polarized laser beams are used as the semiconductor lasers 1 and 1', and a polarization beam splitter is used as the beam splitter 2. On the interference film 2a provided in the beam splitter 2, the laser beam from the semiconductor laser 1 is incident as p polarized light and the laser beam from the semiconductor laser 1' is incident as s polarized light.

In this arrangement, the cross sections of the laser beams are oval. This is because generally, the angle of divergence of a laser beam irradiated from a semiconductor laser differ between in the direction of polarization and in the direction perpendicular thereto. In this embodiment, since the optical elements disposed between the beam splitter 2 and the scanned surface are common to the two laser beams, it is necessary that the directions along the length and width of the cross sections of the two laser beams should be the same.

Therefore, in this embodiment, according to the directions of polarization of the two laser beams irradiated from the semiconductor lasers 1 and 1', an optical member (not shown) such as a ½ wavelength plate or a rotator for rotating the polarized surfaces of the laser beams at 90 degrees is inserted between the semiconductor laser 1 and the beam splitter 2 or between the semiconductor laser 1' and the beam splitter 2.

According to the first embodiment, since the optical elements other than the semiconductor lasers 1 and 1' are all common to the two laser beams as described above, a compact light source system is realized. In addition, the holder comprising a combination of the members for holding the light source system has a high mechanical rigidity.

Now, an adjustment of the laser light source apparatus 4 for use in the multibeam scanning optical apparatus structured and operating as described above will be described. First, only the semiconductor laser 1' which irradiates the laser beam reflected by the beam splitter 2 is turned on. Then, under this condition, the lens barrel 20 holding the condenser lens 3 is moved in the direction of the optical axis along the V-shaped groove 10a of the base block 10 in order to make a focus adjustment so that the laser beam is formed into a point image on the scanned surface. Then, the lens barrel 20 is secured to the base block 10.

Then, with only the semiconductor laser 1' being on, the holding member 14 having the semiconductor laser 1' attached thereto is moved relative to the base block 10 along the surface 14a vertical to the optical axis of the laser beam in order to adjust the direction in which the laser beam exits from the condenser lens 3, so that the position of the spot into which the laser beam is imaged on the scanned surface is adjusted.

Then, only the semiconductor 1 which irradiates the laser beam transmitted by the beam splitter 2 is turned on. Under this condition, the holding member 5 being cylindrical and having the semiconductor laser 1 attached thereto is moved in the direction of the optical axis along the V-shaped groove 7a of the holding member 7 in order to make a focus adjustment. Then, the holding member 5 is secured to the holding member 7.

Lastly, with only the semiconductor laser 1 being on, the holding member 7 having the semiconductor laser 1 secured thereto is moved relative to the base block 10 along the surface 7b vertical to the optical axis of the laser beam in order to adjust the direction in which the laser beam exits from the condenser lens 3, so that the position of the spot into which the laser beam is imaged on the scanned surface is adjusted. According to this method, the semiconductor lasers 1 and 1' and the condenser lens 3 included in the laser light source apparatus 4 are easily and accurately adjusted.

In addition, in this arrangement, since the laser light source apparatus 4 is attached to and detached from the housing 25 while the relative positional relationship among the semiconductor lasers 1 and 1', the beam splitter 2 and the condenser lens 3 is maintained, optical adjustments are easily made when the laser light source apparatus 4 which have been adjusted is mounted in the multibeam scanning optical apparatus and when they are disassembled and re-assembled at the time of maintenance.

Even though these adjustments are made, an angle error from a predetermined direction is sometimes caused when the laser beam irradiated from the semiconductor laser 1 or 1' exits from the condenser lens 3. For example, when the holding member 14 is secured to the base block 10 after the semiconductor laser 1' has been positioned along the surface 14a vertical to the optical axis of the laser beam irradiated therefrom, if one of the screws 15 is tight and the other is loose, an angle error will be caused although it is a slight error. The same may occur when the holding member 7 is secured to the base block 10 by use of the screws 11.

Moreover, when the lens barrel 20 is moved along the V-shaped groove 10a of the base block 10 in order to make the focus adjustment with respect to the condenser lens 3, if the slanting surfaces of the V-shaped groove 10a are not parallel to the optical axis but have an angle error, after the adjustment, an angle error will be caused in the direction of the laser beam irradiated from the condenser lens 3. The same may occur when the holding member 5 having the semiconductor laser 1 secured thereto is moved along the V-shaped groove 7a of the holding member 7.

Moreover, when the holding member 14 is moved along the surface 14a in order to adjust the position of the semiconductor laser 1' within the plane perpendicular to the optical axis, if the surface 14a is not perpendicular to the optical axis but has an angle error, an angle error will be caused in the direction in which the laser beam irradiated from the semiconductor laser 1' exits from the condenser lens 3. The same may occur when the holding member 7 having the semiconductor laser 1 secured thereto is moved along the surface 7b.

In the first embodiment of the present invention, however, since the semiconductor lasers 1 and 1' and the condenser lens 3 are arranged in a manner as described above, even if an angle error as described above is caused at the time of the adjustment, the relative positions of the two spots simultaneously formed on the scanned surface do not largely shift for reasons described later. That is, the adjustment of the laser light source apparatus 4 is easily made since the error sensitivity in the adjustment is small compared to the first prior art.

Moreover, if the members constituting the holder are thermally distorted by the heat generated by the semiconductor lasers 1 and 1', the relative positions of the semiconductor lasers 1 and 1' and the beam splitter 2 may shift. However, according to the first embodiment of the present invention, even if this occurs, the relative positions of the spots formed on the scanned surface do not largely shift also for reasons described later.

The laser light source apparatus 4 is detachably attachable to the housing 25 as a single block integrally and securely holding the semiconductor lasers 1 and 1', the beam splitter 2 and the condenser lens 3. Therefore, when the multibeam scanning optical apparatus having the laser light source apparatus 4 mounted therein is assembled and when it is disassembled and re-assembled at the time of maintenance, optical adjustments are extremely easily made as described above.

In the above-described arrangement, the housing 25 is screwed to the body of an apparatus such as a printer and a copier by use of the through hole 27 and the laser light source apparatus 4 is attached to and detached from the housing 25 by use of the screws 26 while integrally and securely holding the semiconductor lasers 1 and 1', the beam splitter 2 and the condenser lens 3. Therefore, even if the housing 25 is distorted due to stress at the time of assembly, the irradiation directions of the two laser beams irradiated from the semiconductor lasers 1 and 1' do not relatively vary, so that a stable accuracy is maintained for the relative positions of the scanning lines formed on the scanned surface.

In addition, in this arrangement, since the laser light source apparatus includes fewer optical elements (specifically, fewer condenser lenses) than in the first prior art shown in FIG. 5, the size of the laser light source apparatus is reduced and the cost is reduced.

Next, with respect to the multibeam scanning optical apparatus according to the first embodiment of the present invention, i.e. the multibeam scanning optical apparatus in which the laser light source apparatus 4 structured as shown in FIG. 8 is mounted, the following will be described: how much smaller the shift amount of relative positions of the two spots into which the two laser beams are simultaneously imaged on the scanned surface is than in the first prior art of FIG. 5, and how more stable the image formed on the scanned surface is than in the first prior art, due to the smaller shift amount.

Figure 12:
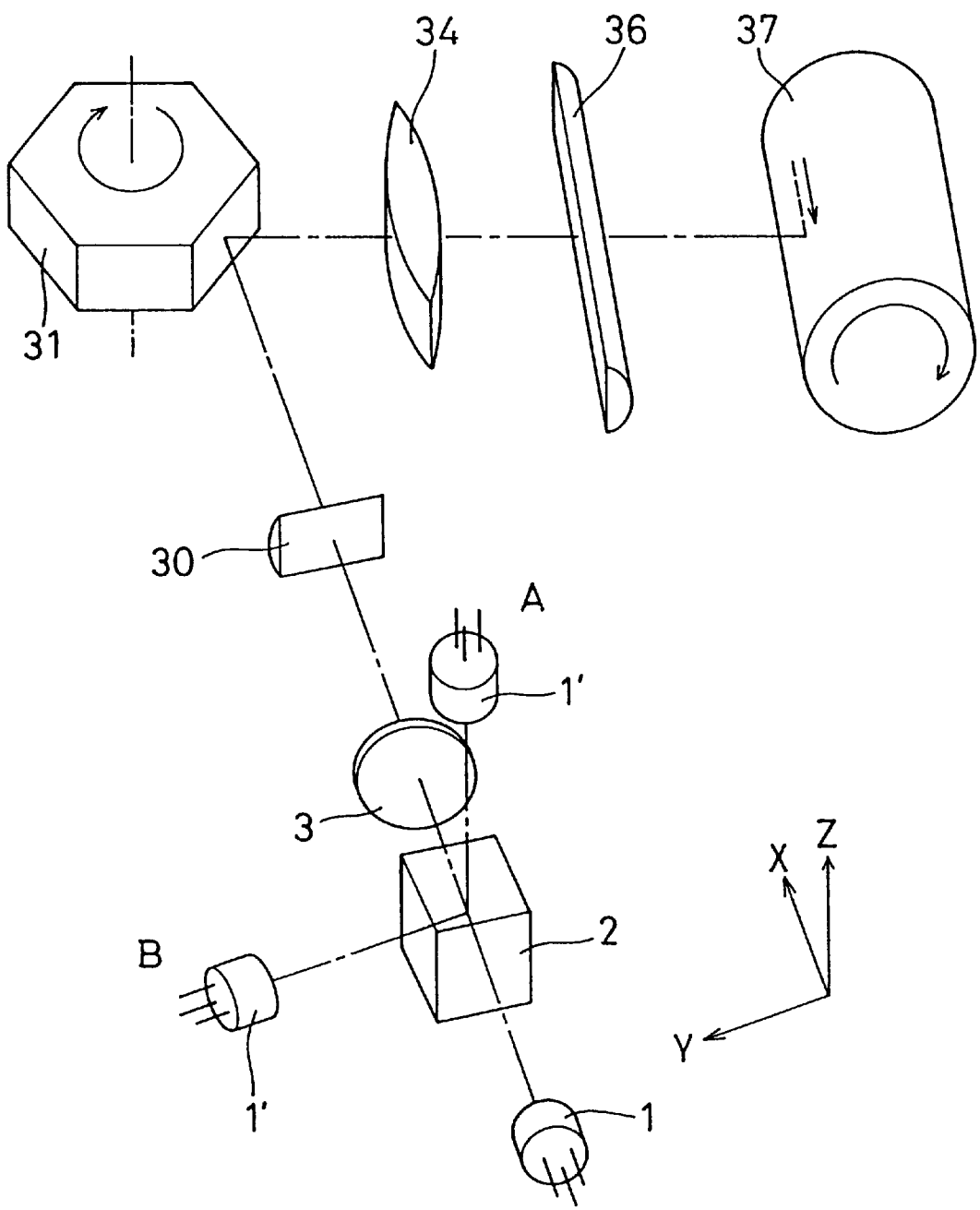
FIG. 12 is a perspective view showing a schematic arrangement of an optical system of the multibeam scanning optical apparatus of FIG. 7.

FIG. 12 is a perspective view showing a schematic arrangement of the optical system of the multibeam scanning optical apparatus according to the first embodiment. This figure shows the second cylindrical lens 36 which is not shown in FIG. 7, and a photoreceptor drum 37 having the scanned surface. While in this figure, the two laser beams are depicted such that their optical axes coincide with each other after having exited from the beam splitter 2, in actuality, the optical axes are two substantially parallel lines which are close to each other and the laser beams are imaged on the scanned surface into two spots with a predetermined distance therebetween in the sub scanning direction.

In the vicinity of the beam splitter 2, X-axis is set in the direction of the optical axis of the laser beam irradiated from the semiconductor laser 1, Z-axis is set in the direction vertical to a plane parallel to the X-axis and to the main scanning direction, and Y-axis is set in a direction vertical to a plane parallel to the X- and Z-axes. When the optical axis of the laser beam irradiated from the semiconductor laser 1 to be directed by way of the beam splitter 2, the condenser lens 3, the first cylindrical lens unit 30, the deflecting surface of the polygonal mirror 31, the fθ lens unit 34 and the second cylindrical lens unit 36 to the scanned surface provided on the photoreceptor drum 37 is located within a single plane (a plane parallel to the plane of the figure in FIG. 7), the direction of the Y-axis is a direction within the main scanning plane and the direction of the Z-axis coincides with the sub scanning direction.

When the X-, Y- and Z-axes are set as mentioned above, the position of the semiconductor laser 1' of FIGS. 7 and 8 corresponds to a position A of FIG. 12, i.e. a position such that the laser beam irradiated from the semiconductor laser 1' is incident on the beam splitter 2 in the -Z-direction. As is easily understood, it is also possible to dispose the semiconductor laser 1' in a position such that the laser beam irradiated therefrom is incident on the beam splitter 2 in the -Y-direction.

With respect to the first prior art shown in FIG. 5 and the first embodiment of the present invention shown in FIG. 12, the case where the semiconductor laser 1' is disposed in the position A will be described with reference to FIGS. 1A, 1B, 2, 13A, 13B and 14. Note that, in the following description, developed views will be used where the optical axis of the laser beam from the semiconductor laser 1 to the scanned surface 37a is depicted as a single straight line, and the directions of the Y- and Z-axes in FIG. 12 will be referred to as the main scanning direction and the sub scanning direction, respectively.

FIGS. 1A and 1B show a general arrangement of the multibeam scanning optical system of the first prior art from the semiconductor lasers 1 and 1' to the scanned surface 37a provided on the photoreceptor drum 37. FIG. 1A includes the optical axis of the laser beam irradiated from the semiconductor laser 1 and shows a cross section parallel to the main scanning direction (hereinafter, referred to as main scanning direction cross section). FIG. 1B includes the optical axis of the laser beam irradiated from the semiconductor laser 1 and shows a cross section parallel to the sub scanning direction (hereinafter, referred to as sub scanning direction cross section).

As is apparent from FIG. 1A, within the main scanning direction cross section, the laser beam irradiated from the semiconductor laser 1 (and also the laser beam irradiated from the semiconductor laser 1' although not shown in the figure) is shaped into a parallel luminous flux by the condenser lens 301 (or the condenser lens 301') and then, passes through the beam splitter 2 to be imaged on the scanned surface 37a by the fθ lens unit 34. The first and second cylindrical lens units 30 and 36 do not work in the main scanning direction.

As is apparent from FIG. 1B, within the sub scanning direction cross section, the laser beams irradiated from the semiconductor lasers 1 and 1' are shaped into parallel luminous fluxes by the condenser lenses 301 and 301', respectively. Then, the laser beam from the semiconductor laser 1 is transmitted by the interference film 2a of the beam splitter 2 and the laser beam from the semiconductor laser 1' is reflected thereby, so that the directions of the two laser beams are the same. The two laser beams are first imaged by the first cylindrical lens unit 30 only in the sub scanning direction in the vicinity of the deflecting surface of the polygonal mirror 31 and are then imaged on the scanned surface 37a by the second cylindrical lens unit 36. The scanning lens unit 34 does not work in the sub scanning direction.

Figure 13A:
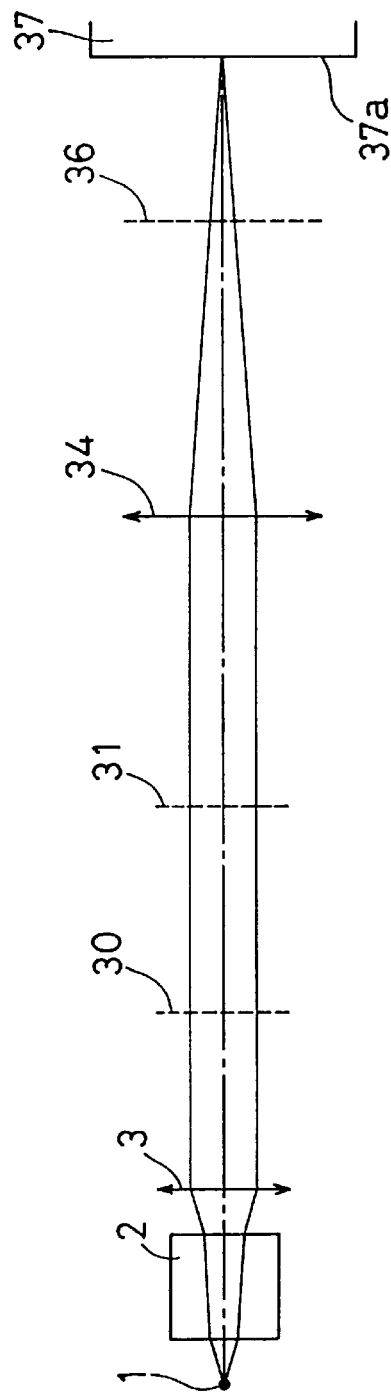
FIG. 13A shows a main scanning direction cross section of the multibeam scanning optical system from two semiconductor lasers to a scanned surface provided on a photoreceptor drum in a case where the semiconductor laser which irradiates the laser beam reflected by a beam splitter is disposed within a sub scanning direction cross section in the first embodiment.
Figure 13B:
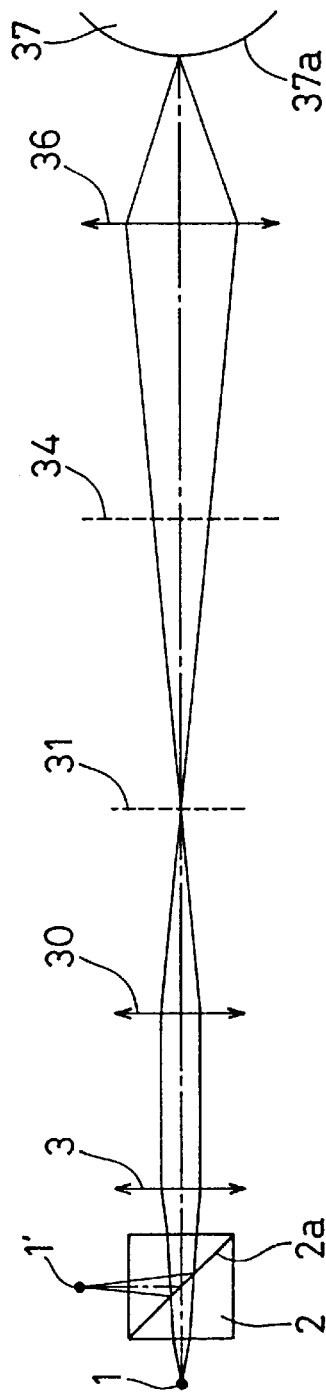
FIG. 13B shows a sub scanning direction cross section of the multibeam scanning optical system of FIG. 13A.

FIGS. 13A and 13B show a general arrangement of the multibeam scanning optical system according to the first embodiment of the present invention. FIG. 13A shows the main scanning direction cross section. FIG. 13B shows the sub scanning direction cross section. In this arrangement, unlike the above-described first prior art, the laser beams irradiated from the semiconductor lasers 1 and 1' are first incident on the beam splitter 2 to be directed in the same direction by the interference film 2a. Then, they are both shaped into parallel luminous fluxes by a single condenser lens 3. The arrangement therefrom to the scanned surface 37a is the same as that of the first prior art.

In both of the arrangements of FIGS. 1A and 1B and FIGS. 13A and 13B, the position of the spot formed on the scanned surface 37a shifts when the position of the semiconductor laser 1 or 1' shifts relative to the interference film 2a of the beam splitter 2. Consider a case where the position of the semiconductor laser 1 or 1' shifts by a same amount in the arrangements. The position of the spot formed by the laser beam irradiated from the semiconductor laser 1', i.e. the reflected laser beam shifts larger than the spot formed by the laser beam irradiated from the semiconductor laser 1, i.e. the transmitted laser beam. Therefore, the position shift amount of the spot on the scanned surface 37a is evaluated herein only with respect to the case where the position of the semiconductor laser 1' shifts relative to the interference film 2a of the beam splitter 2.

Figure 2:
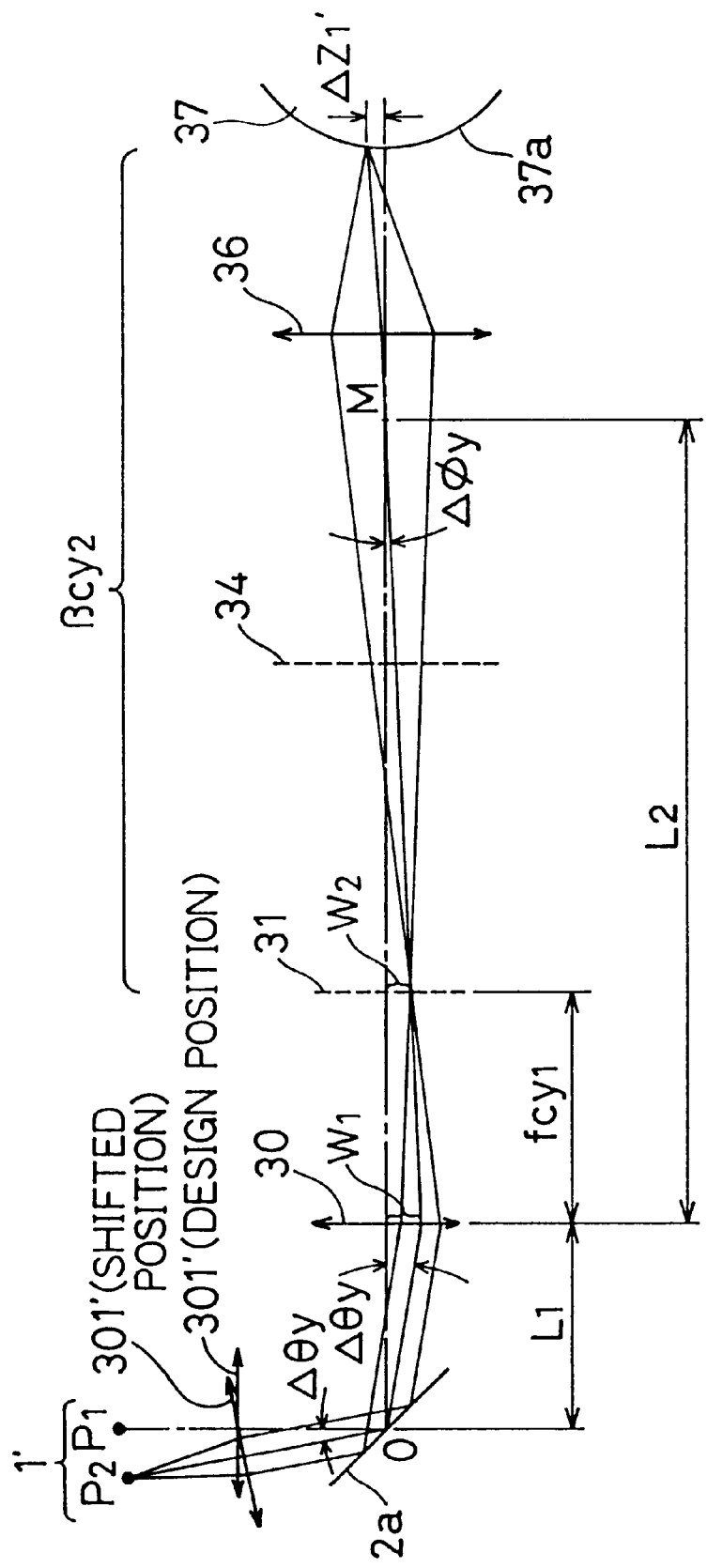
FIG. 2 is a view used for obtaining the position shift amount of a spot into which a laser beam irradiated from the opposite side semiconductor laser is imaged on the scanned surface when the irradiation point of the semiconductor laser shifts from a predetermined position within the sub scanning direction cross section in the arrangement according to the first prior art of FIGS. 1A and 1B.

In the arrangement according to the first prior art shown in FIGS. 1A and 1B, as shown in FIG. 2, when the irradiation point of the semiconductor laser 1' shifts from a predetermined position P1 to a position P2 within the sub scanning direction cross section, the spot into which the laser beam irradiated from the semiconductor laser 1' is imaged on the scanned surface 37a shifts by $\Delta z1'$ in the sub scanning direction. At this time, the condenser lens 301' which is typically held integrally with the semiconductor laser 1' is assumed to shift integrally with the semiconductor laser 1'.

When the point where the design optical axis of the laser beam irradiated from the semiconductor laser 1' intersects the interference film 2a of the beam splitter 2 is O, the distance between the point O and the principal point of the first cylindrical lens unit 30 is L1, the conjugate point of the point O with respect to the first cylindrical lens unit 30 is M, the distance from the point M to the principal point of the first cylindrical lens unit 30 is L2, and the focal length of the first cylindrical lens unit 30 in the sub scanning direction is $fcy1$, following expression (1) or (1') holds:

$$(1/L1)+(1/L2)=1/fcy1 \tag{1}$$

$$1/L2=(L1-fcy1)/(fcy1 \cdot L1) \tag{1'}$$

Since the laser beams incident on the cylindrical lens unit 30 as parallel luminous fluxes are imaged in the sub scanning direction at the deflecting surface of the polygonal mirror 31, as shown in FIG. 2, the focal length $fcy1$ is the distance between the principal point of the cylindrical lens unit 30 and the deflecting surface of the polygonal mirror 31.

When an angle between a straight line OP1 and a straight line OP2 is $\Delta\theta y$ and an angle between an optical axis shifted at the point M and the design optical axis is $\Delta\phi y$, the following expression holds with respect to a position shift amount $w1$ of the optical axis of the first cylindrical lens unit 30 at the principal point:

$$w1=L1 \cdot \tan \Delta\theta y = L2 \cdot \tan \Delta\phi y \tag{2}$$

Therefore, from the expressions (1') and (2), the following expression is obtained:

$$\tan \Delta\phi y = (L1/L2) \cdot \tan \Delta\theta y = \{(L1-fcy1)/fcy1\} \cdot \tan \Delta\theta y \tag{3}$$

Moreover, with respect to a position shift amount w2 of the optical axis in the sub scanning direction at the deflecting surface of the polygonal mirror 31:

$$w2 = (L2 - fcy1) \cdot \tan \Delta\phi y \quad (4)$$

Substituting the expressions (1') and (3) into the expression (4), the following expression is obtained:

$$w2 = fcy1 \cdot \tan \Delta\theta y \quad (5)$$

When a magnification of the second cylindrical lens unit 36 in the sub scanning direction is βcy2, the position shift amount w2 of the optical axis at the deflecting surface of the polygonal mirror 31 is projected βcy2 times on the scanned surface 37a. Therefore, in this case, the position shift amount Δz1' of the spot on the scanned surface 37a is given by the following expression:

$$\Delta z1' = w2 \cdot \beta cy2 = fcy1 \cdot \beta cy2 \cdot \tan \Delta\theta y \quad (6)$$

Figure 14:
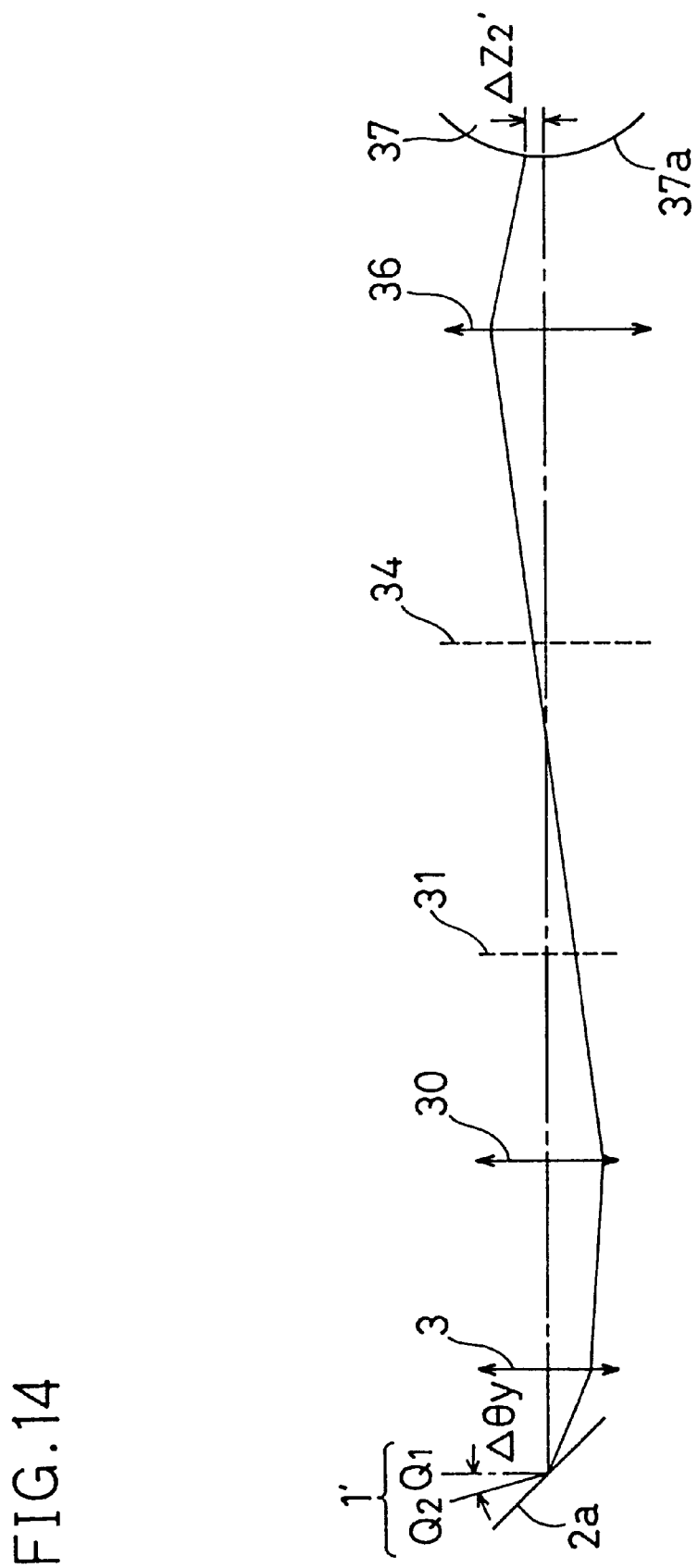
FIG. 14 is a view used for obtaining the position shift amount of a spot into which a laser beam irradiated from the opposite side semiconductor laser is imaged on the scanned surface when the irradiation point of the semiconductor laser shifts from a predetermined position within the sub scanning direction cross section in an arrangement according to the first embodiment of FIGS. 13A and 13B.

In the arrangement according to the first embodiment of the present invention shown in FIGS. 13A and 13B, as shown in FIG. 14, when the semiconductor laser 1' shifts from a predetermined position Q1 to a position Q2 within the sub scanning direction cross section, the spot into which the laser beam irradiated from the semiconductor laser 1' is imaged on the scanned surface 37a shifts by Δz2' in the sub scanning direction.

When the irradiation point of the semiconductor laser 1' shifts within the sub scanning direction cross section, assuming that the amount of the position shift is projected on the scanned surface 37a being enlarged by the overall sub scanning direction magnification of the scanning optical system, the position shift amount Δz2' of the spot is given by the following expression:

$$\Delta z2' = d \cdot \beta s \cdot \sin \Delta\theta y \quad (7)$$

where:

d is an optical distance between the irradiation point of the semiconductor laser 1' and a point where the design optical axis of the laser beam irradiated therefrom intersects the interference film 2a of the beam splitter 2;

βs is the overall sub scanning direction magnification of the scanning optical system from the semiconductor laser 1' to the scanned surface 37a; and Δθy is an angle shift amount of the optical axis of the laser beam irradiated from the semiconductor laser 1' from the design optical axis of the laser beam within the sub scanning direction cross section, i.e. an angle between the straight line OQ1 and the straight line OQ2.

The assumption that the angle shift amount of the optical axis of the laser beam irradiated from the semiconductor laser 1' from the design optical axis of the laser beam within the sub scanning direction cross section in FIG. 2 equals that in FIG. 14, i.e. Δθy of the expression (6) equals Δθy of the expression (7) is appropriate for comparing the spot position shift amounts Δz1' and Δz2' in FIG. 2 and FIG. 14. Since Δθy assumed in these multibeam scanning optical systems is a slight value even at the maximum (on the order of 1/10000 radian, approximately 1' in degrees), if radian is used as the unit for the angle in the expressions (6) and (7), tan Δθy and sin Δθy both approximate to Δθy.

Therefore, the expressions (6) and (7) are rewritten as follows:

$$\Delta z1' = fcy1 \cdot \beta cy2 \cdot \Delta\theta y \quad (6')$$

$$\Delta z2' = d \cdot \beta s \cdot \Delta\theta y \quad (7')$$

By comparing Δz1' of the expression (6') and Δz2' of the expression (7'), the position shift amount of the spot into which the laser beam irradiated from the semiconductor laser 1' is imaged on the scanned surface 37a is compared between in the first prior art shown in FIG. 10 and in the first embodiment of the present invention shown in FIG. 11. The comparison is made based on the sign of the following expression (8):

$$U = (\Delta z1' - \Delta z2')/\Delta\theta y = fcy1 \cdot \beta cy2 - d \cdot \beta s \quad (8)$$

In FIGS. 13A and 13B, when the focal length of the condenser lens 3 is fco, the overall sub scanning direction magnification βs of the scanning optical system is expressed from the definition as follows:

$$\beta s = (fcy1/fco) \cdot \beta cy2 \quad (9)$$

Here, in FIGS. 2 and 14, it is assumed that constants associated with the arrangement of the optical system from the first cylindrical lens unit 30 to the scanned surface 37a are the same.

Modifying the expression (8) by use of the expression (9), the following expression is obtained:

$$U = fcy1 \cdot \beta cy2 - d \cdot (fcy1/fco) \cdot \beta cy2 = fcy1 \cdot \beta cy2 \cdot \{1 - (d/fco)\} \quad (10)$$

In the multibeam scanning optical system described herein, it is clear that $$d < fco \quad (11),$$

therefore, $$U > 0 \quad (12)$$

Consequently, in the arrangements of the optical systems shown in FIGS. 1A and 1B and FIGS. 13A and 13B, when the position of the semiconductor laser 1' shifts by a same amount within the sub scanning direction cross section, the position shift amount of the spot on the scanned surface 37a is smaller in the first embodiment of the present invention shown in FIGS. 13A and 13B than in the first prior art shown in FIGS. 1A and 1B. Thus, in the first embodiment of the present invention, the obtained images are more stable and have less non-uniformity in pitches of the scanning lines than in the first prior art.

Next, with respect to the case where the semiconductor laser 1' is disposed in the position B in the first prior art shown in FIG. 5 and in the first embodiment of the present invention shown in FIG. 12, the position shift amount of the spot on the scanned surface 37a will be evaluated with reference to FIGS. 3A, 3B, 4, 15A, 15B and 16.

FIGS. 3A and 3B and FIGS. 15A and 15B show general arrangements of the multibeam scanning optical systems of the first prior art and the first embodiment of the present invention, respectively. FIGS. 3A and 15A show the main scanning direction cross sections. FIGS. 3B and 15B show the sub scanning direction cross sections. In these arrangements, the semiconductor laser 1' which irradiates the laser beam reflected by the interference film 2a of the beam splitter 2 is disposed in a position such that the laser beam irradiated therefrom is incident on the beam splitter 2 from the main scanning direction. The arrangements therefrom to the scanned surface 37a are the same as those shown in FIGS. 1A and 1B and FIGS. 13A and 13B, respectively.

Figure 4:
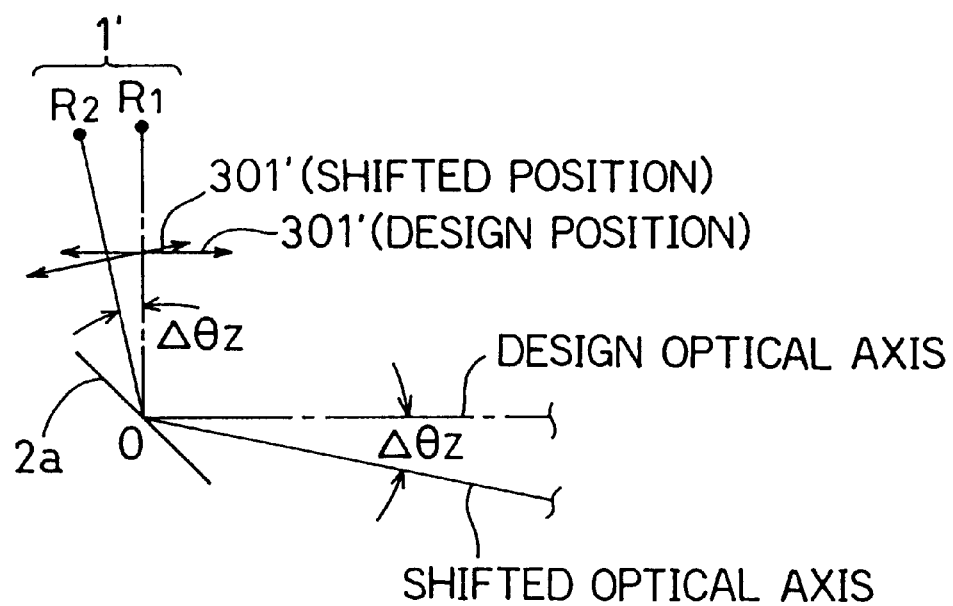
FIG. 4 is a view used for obtaining the position shift amount of the spot into which the laser beam irradiated from the opposite side semiconductor laser is imaged on the scanned surface when the irradiation point of the semiconductor laser shifts from a predetermined position within the main scanning direction cross section in an arrangement according to the first prior art of FIGS. 3A and 3B.

In the arrangement according to the first prior art shown in FIGS. 3A and 3B, as shown in FIG. 4, when the irradiation point of the semiconductor laser 1' shifts from a predetermined point R1 to a point R2 within the main scanning direction cross section, the spot into which the laser beam irradiated from the semiconductor laser 1' is imaged on the scanned surface 37*a* shifts in the main scanning direction. At this time, the condenser lens 301' which is typically held integrally with the semiconductor laser 1' is assumed to shift integrally with the semiconductor laser 1'.

In this case, a position shift amount $\Delta y1'$ of the spot on the scanned surface 37*a* is generally given by the following expression:

$$\Delta y1' = k \cdot \Delta\theta z \quad (13)$$

where:

k is a proportional constant; and $\Delta\theta z$ is an angle shift amount of the optical axis of the laser beam irradiated from the semiconductor laser 1' from the design optical axis of the laser beam, i.e. an angle between a straight line OR1 and a straight line OR2 when the point where the design optical axis of the laser beam intersects the interference film 2*a* of the beam splitter 2 is O.

Generally, when a laser beam deflected at a uniform angular velocity is transmitted by an fθ lens, the main scanning direction position y' of the spot into which the laser beam is imaged on the scanned surface is given by the following expression:

$$y' = f \cdot \theta \quad (14)$$

where:

f is the focal length of the fθ lens; and

θ is an angle between the optical axis of the laser beam incident on the fθ lens and the optical axis of the fθ lens.

Therefore, in an optical system fulfilling the expression (14), when the angle at which the laser beam is incident on the fθ lens shifts by $\Delta\theta$ in the main scanning direction, the expression (14) is rewritten as follows:

$$y' + \Delta y' = f \cdot (\theta + \Delta\theta) \quad (15)$$

That is, when the angle at which the laser beam is incident on the fθ lens shifts by $\Delta\theta$ in the main scanning direction, if the position shift of the spot into which the laser beam is imaged on the scanned surface is caused only by the fθ lens, the position shift amount $\Delta y'$ corresponds to the second term of the right side of the expression (15) and expressed as follows:

$$\Delta y' = f \cdot \Delta\theta \quad (16)$$

Here, the expressions (13) and (16) are of the same format. That is, if the main scanning direction position shift of the spot on the scanned surface 37*a* is caused only by the shift of the angle at which the laser beam is incident on the fθ lens unit 34, the proportional constant k of the expression (13) equals the focal length f of the fθ lens unit 34.

In actuality, since the laser beam is obliquely incident also on the first and second cylindrical lens units 30 and 36 having no power in the main scanning direction, the spot on the scanned surface 37*a* shifts in the main scanning direction. However, even in that case, the proportional constant k substantially equals the focal length f of the fθ lens unit 34.

Figure 16:
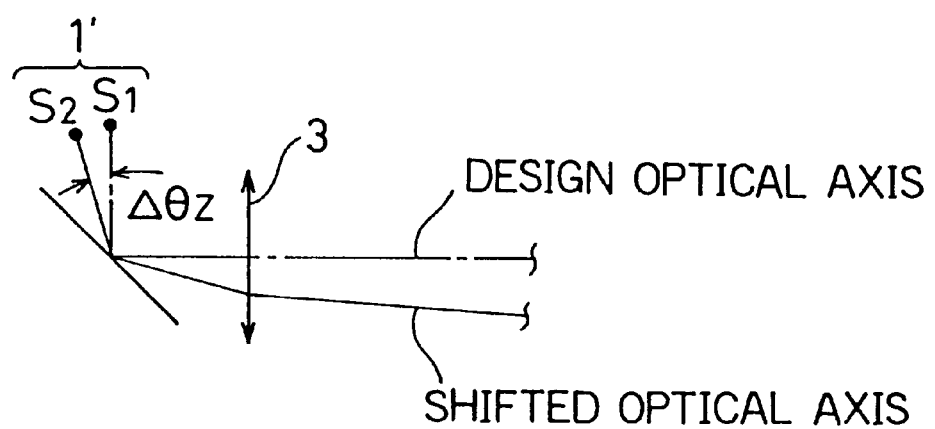
FIG. 16 is a view used for obtaining the position shift amount of the spot into which the laser beam irradiated from the opposite side semiconductor laser is imaged on the scanned surface when the irradiation point of the semiconductor laser shifts from a predetermined position within the main scanning direction cross section in an arrangement according to the first embodiment of FIGS. 15A and 15B.

In the arrangement according to the first embodiment of the present invention shown in FIG. 14, as shown in FIG. 16, when the semiconductor laser 1' shifts from a predetermined position S1 to a position S2 within the main scanning direction cross section, the spot into which the laser beam irradiated from the semiconductor laser 1' is imaged on the scanned surface 37*a* shifts in the main scanning direction.

When the irradiation point of the semiconductor laser 1' shifts within the main scanning direction cross section, assuming that the amount of the position shift is projected on the scanned surface 37*a* being enlarged by the overall main scanning direction magnification of the scanning optical system, the spot position shift amount $\Delta y2'$ is given by the following expression:

$$\Delta y2' = d \cdot \beta m \cdot \sin\Delta\theta z \quad (17)$$

where:

d is an optical distance between the irradiation point of the semiconductor laser 1' and a point where the design optical axis of the laser beam irradiated therefrom intersects the interference film 2*a* of the beam splitter 2;

βm is the overall main scanning direction magnification of the scanning optical system from the semiconductor laser 1' to the scanned surface 37*a*; and $\Delta\theta z$ is an angle shift amount of the optical axis of the laser beam irradiated from the semiconductor laser 1' from the design optical axis of the laser beam within the main scanning direction cross section, i.e. an angle between the straight line OS1 and the straight line OS2.

The assumption that the angle shift amount of the optical axis of the laser beam irradiated from the semiconductor laser 1' from the design optical axis of the laser beam in FIG. 14 equals that in FIGS. 3A and 3B, (i.e. $\Delta\theta z$ of the expression (13) equals $\Delta\theta z$ of the expression (17)) is appropriate for comparing the spot position shift amounts $\Delta y1'$ and $\Delta y2'$ in FIG. 14 and FIGS. 3A and 3B. Since $\Delta\theta z$ assumed in the multibeam scanning optical systems is a slight value even at the maximum (on the order of 1/10000 radian, approximately 1' in degrees), if radian is used as the unit for the angle in the expression (17), sin $\Delta\theta z$ approximates to $\Delta\theta z$. Therefore, the expression (17) is rewritten as follows:

$$\Delta y2' = d \cdot \beta m \cdot \Delta\theta z \quad (17')$$

By comparing $\Delta y1'$ of the expression (13) and $\Delta y2'$ of the expression (17') by using radian as the unit for the angle, the position shift amount of the spot into which the laser beam irradiated from the semiconductor laser 1' is imaged on the scanned surface 37*a* is compared between in the first prior art shown in FIGS. 13A and 13B and in the first embodiment of the present invention shown in FIG. 2. The comparison is made based on the sign of the following expression (18):

$$V = (\Delta y1' - \Delta y2')/\Delta\theta z = k - d \cdot \beta m \quad (18)$$

Here, the proportional constant k substantially equals the focal length f of the scanning lens unit 34 as mentioned above and is typically 200 mm or more. d is approximately 5 mm. βm is approximately 18. Therefore, in typical multibeam scanning optical systems, $$V > 0 \quad (19)$$

Therefore, in the arrangements of the optical systems shown in FIGS. 3A and 3B and FIGS. 15A and 15B, when the position of the semiconductor laser 1' shifts by a same amount within the main scanning direction cross section, the position shift amount of the spot on the scanned surface 37*a* is smaller in the first embodiment of the present invention shown in FIGS. 15A and 15B than in the first prior art shown in FIGS. 3A and 3B. Thus, in the first embodiment of the present invention, the obtained images are more stable and have less non-uniformity of the scanning lines than in the first prior art.

The position shift of the semiconductor lasers 1 and 1' can be caused not only in the above-mentioned directions but also in any directions. For example, in the first prior art shown in FIG. 5 and in the first embodiment of the present invention shown in FIG. 12, when the semiconductor laser 1' is disposed in the position A, if the position shift of the semiconductor laser 1' is caused not within the sub scanning direction cross section but within a plane vertical to the optical axis, the position shift of the spot on the scanned surface 37a will also be caused in the main scanning direction. In this case, however, the position shift amount of the spot is smaller in the first embodiment of the present invention than in the first prior art for the same reason as that described with reference to FIGS. 4 and 16 with respect to the case where the semiconductor laser 1' is disposed in the position B.

When the semiconductor laser 1' is disposed in the position B, if the position shift of the semiconductor laser 1' is caused not within the main scanning direction cross section but within a plane vertical to the optical axis, the position shift of the spot on the scanned surface 37a will also be caused in the sub scanning direction. In this case, however, the position shift amount of the spot is smaller in the first embodiment of the present invention than in the first prior art for the same reason as that described with reference to FIGS. 4 and 16 with respect to the case where the semiconductor laser 1' is disposed in the position A.

The effect of the position shift of the semiconductor laser 1' (i.e. so-called opposite side semiconductor laser which, when shifted, causes a greater position shift of the spot on the scanned surface) in the first prior art and in the first embodiment of the present invention was described in the above. Now, conditions will be described which the multi-beam scanning optical system in the first embodiment of the present invention should fulfill in order that the position shift amount of the spot on the scanned surface 37a caused by the position shift of the semiconductor laser 1' is within a permissible range.

As described above, in the first embodiment of the present invention, when the semiconductor laser 1' is disposed in the position A of FIG. 12, if the semiconductor laser 1' shifts within the sub scanning direction cross section, the spot on the scanned surface 37a shifts in the sub scanning direction and the position shift amount $\Delta z2'$ (unit: mm) is given by the following expression:

$$\Delta z2' = d \cdot \beta s \cdot \Delta \theta y \tag{7'}$$

where:
d is an optical distance (unit: mm) between the irradiation point of the semiconductor laser 1' and a point where the optical axis of the laser beam irradiated therefrom intersects the interference film 2a of the beam splitter 2; and $\beta s$ is the overall sub scanning direction magnification of the scanning optical system from the semiconductor laser 1' to the scanned surface 37a; and $\Delta \theta y$ is an angle shift amount (unit: radian) of the optical axis of the laser beam irradiated from the semiconductor laser 1' from the design optical axis of the laser beam within the sub scanning direction cross section.

If $\Delta z2'$ is great, the laser beam irradiated from the semiconductor laser 1' largely shifts in the sub scanning direction when it is imaged on the scanned surface 37a into a spot. If the dot printed according to the spot too largely shifts for the design dot pitch in the sub scanning direction, the image quality greatly deteriorates.

Therefore, the permissible limit of $\Delta z2'$ is generally expressed, by using a positive number n, as 1/n the design dot pitch in the sub scanning direction. That is, the following expression is obtained:

$$\Delta z2' < (1/n) \cdot (25.4/Pi) \tag{20}$$

where Pi is a printing density (unit: dpi) in the sub scanning direction. Here, the numeral 25.4 on the right side is a coefficient for converting the unit for length from inch to millimeter.

Rearranging the expressions (7') and (20), the following expression is obtained:

$$d \cdot \beta s \cdot Pi < 25.4/(n \cdot \Delta \theta y) \tag{21}$$

Here, n is a value which does not very largely differ among optical systems used for the same purpose, and $\Delta \theta y$ is an amount which does not very largely differ among beam splitters 2 of different sizes.

As also described above, in the first embodiment of the present invention, when the semiconductor laser 1' is disposed in the position B of FIG. 12, if the position of the semiconductor laser 1' shifts within the main scanning direction cross section, the position of the spot on the scanned surface 37a shifts in the main scanning direction and the position shift amount $\Delta y2'$ (unit: mm) is given by the following expression:

$$\Delta y2' = d \cdot \beta m \cdot \Delta \theta z \tag{17'}$$

where:
d is an optical distance (unit: mm) between the irradiation point of the semiconductor laser 1' and a point where the optical axis of the laser beam irradiated therefrom intersects the interference film 2a of the beam splitter 2;

$\beta m$ is the overall main scanning direction magnification of the scanning optical system from the semiconductor laser 1' to the scanned surface 37a; and $\Delta \theta z$ is an angle shift amount (unit: radian) of the optical axis of the laser beam irradiated from the semiconductor laser 1' from the design optical axis within the main scanning direction cross section.

If $\Delta y2'$ is great, the laser beam irradiated from the semiconductor laser 1' largely shifts in the main scanning direction when it is imaged on the scanned surface 37a into a spot. If the dot printed according to the spot too largely shifts for the design dot pitch in the main scanning direction, the image quality greatly deteriorates.

Therefore, the permissible limit of $\Delta y2'$ is generally expressed, by using a positive number n, as 1/n the design dot pitch in the main scanning direction. That is, the following expression is obtained:

$$\Delta y2' < (1/n) \cdot (25.4/Pi) \tag{22}$$

where Pi is a printing density (unit: dpi) in the main scanning direction. Here, the numeral 25.4 on the right side is a coefficient for converting the unit for length from inch to millimeter.

Rearranging the expressions (17') and (22), the following expression is obtained:

$$d \cdot \beta m \cdot Pi < 25.4/(n \cdot \Delta \theta z) \tag{23}$$

Here, n is a value which does not very largely differ among optical systems used for the same purpose, and $\Delta \theta z$ is an amount which does not very largely differ among beam splitters 2 of different sizes.

The above-obtained expressions (21) and (23) are of the same format. That is, they may be unified as:

$$d \cdot \beta \cdot Pi < C(\text{constant}) \quad (24)$$

where:

d is an optical distance (unit: mm) between the irradiation point of the semiconductor laser 1' and a point where the optical axis of the laser beam irradiated therefrom intersects the interference film 2a of the beam splitter 2, more specifically, the sum of the length of the optical path from the irradiation point to the beam splitter 2 and a value obtained by dividing the length of the optical path within the beam splitter 2 by the refractive index of the material of the beam splitter 2; and β is the overall sub scanning direction magnification of the scanning optical system from the semiconductor laser 1' to the scanned surface 37a when the semiconductor laser 1' is disposed in the position A of FIG. 12, and the overall main scanning direction magnification of the scanning optical system from the semiconductor laser 1' to the scanned surface 37a when the semiconductor laser 1' is disposed in the position B of FIG. 12.

The value of the left side of the expression (24) represents the degree of "unlikeness of occurrence of the position shift" particular to the optical system in the first embodiment. The causes of Δθ of the expression (24) include the following with respect to the laser light source apparatus 4 shown in FIG. 8:

(i) error caused when the semiconductor laser 1' is attached to the holding member 14;

(ii) non-uniformity of the irradiation direction of the laser beam irradiated from the semiconductor laser 1', caused in manufacture;

(iii) manufacture error of the holding member 14, and error caused when the holding member 14 is attached to the base block 10;

(iv) change of the configuration of the holding member 14 caused by a temperature change due to the heat generated by the semiconductor laser 1'; and (v) manufacture error, attachment error and configuration change due to a temperature change, of the beam splitter 2.

The causes (i) to (v) in combination result in Δθ of approximately 0.1 degrees when the laser light source apparatus 4 is in actual use.

A test was carried out by use of an experimental model and it was found that the constant C on the right side of the expression (24) does not have to be more than 40000. Tables 1 and 2 show the values of the amounts d, βm, βs and Pi used for the experimental model and the values of d·βm·Pi and d·βs·Pi corresponding thereto.

TABLE 1

| Amount | (Unit) | Value |
|---|---|---|
| d | (mm) | 5.47 |
| βs |  | 18 |
| βm |  | 9.7 |
| Pi | (dpi) | 400 |
| d · βm · Pi |  | 39400 |
| d · βs · Pi |  | 21200 |

TABLE 2

| Amount | (Unit) | Value |
|---|---|---|
| d | (mm) | 3.64 |
| βs |  | 18.6 |
| βm |  | 10.4 |
| Pi | (dpi) | 400 |
| d · βm · Pi |  | 27100 |
| d · βs · Pi |  | 15100 |

Figure 17:
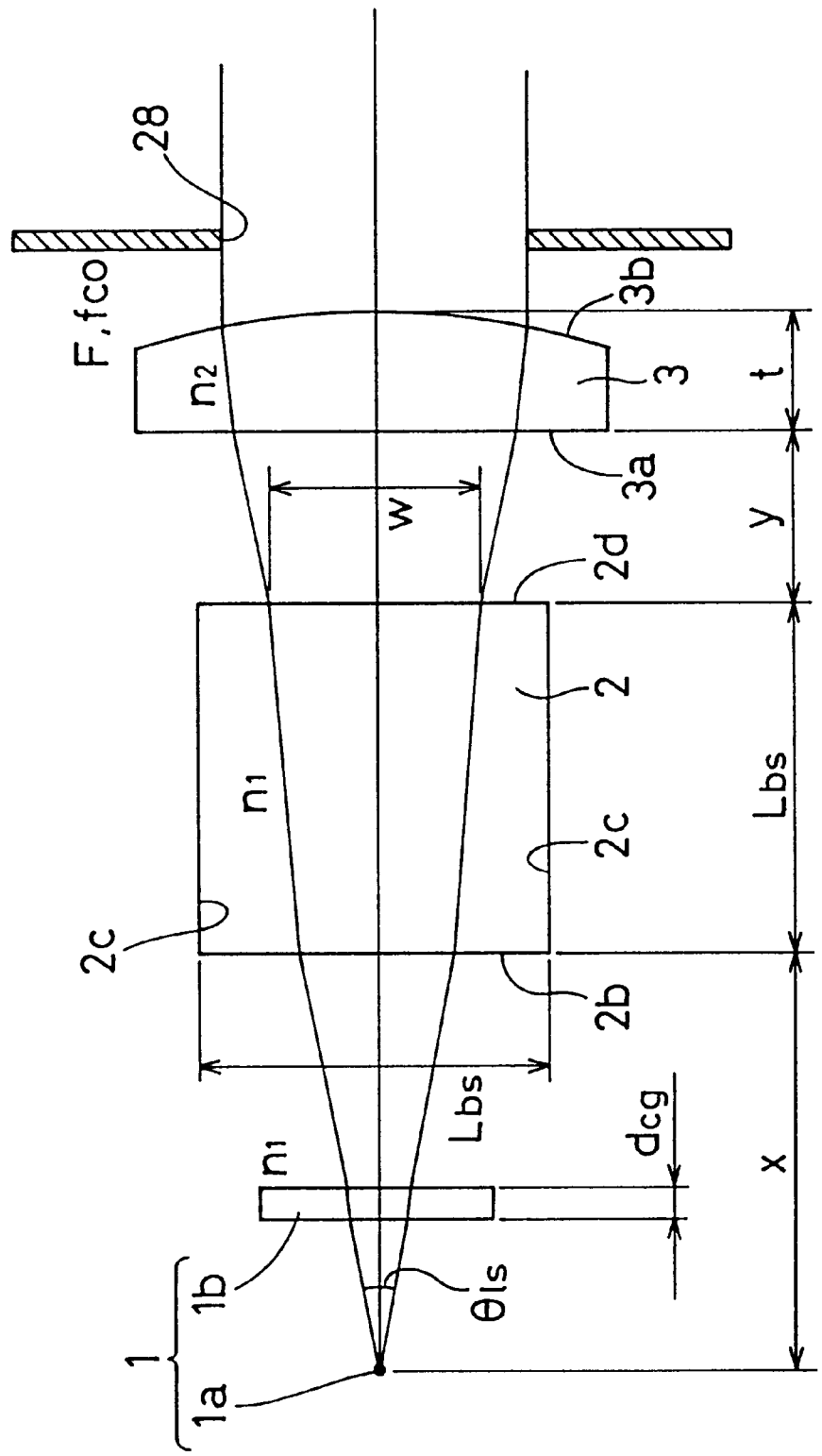
FIG. 17 is a view of assistance in explaining conditions to be fulfilled by the size of the beam splitter in the first embodiment.

Next, conditions will be described which the size of the beam splitter 2 should fulfill in the first embodiment. As shown in FIG. 17, the size of the beam splitter 2 is limited by the two conditions shown below. Note that the laser beam reflected by the interference film 2a of the beam splitter 2 and the semiconductor laser 1' irradiating the laser beam are not shown in FIG. 17, since the semiconductor lasers 1 and 1' are substantially symmetrical with respect to the interference film 2a of the beam splitter 2.

The conditions are as follows:

(condition 1) that the effective luminous flux of the laser beam irradiated from the semiconductor laser 1' to be incident on the beam splitter 2 is not eclipsed by a side surface 2c of the beam splitter 2; and (condition 2) that the beam splitter 2 can be is disposed between the semiconductor laser 1 and the condenser lens 3.

Here, in FIG. 17, the length of one side of the beam splitter 2 is Lbs, the angle of divergence of the effective luminous flux of the laser beam irradiated from an irradiation point 1a of the semiconductor laser 1 is θls, the thickness of a cover glass 1b abutting a window of the semiconductor laser 1 is dcg, the thickness of the condenser lens 3 is t, the distance between the irradiation point 1a of the semiconductor laser 1 and an incidence surface 2b of the beam splitter 2 is x, the distance between an exit surface 2d of the beam splitter 2 and an incidence surface 3a of the condenser lens 3 is y, and the width of the effective luminous flux of the laser beam at the exit surface 2d of the beam splitter 2 is w. And the refractive index of the cover glass 1b and the beam splitter 2 is n1, the refractive index of the condenser lens 3 is n2, and the F number and the focal length of the condenser lens 3 are F and fco, respectively. Numeral 28 represents the aperture for shaping the laser beam.

Then, the condition (1) is expressed as:

$$w < Lbs \quad (25)$$

Here, w is expressed as:

$$w = 2 \cdot [\{x - dcg \cdot (1-(1/n1))\} \cdot \tan(\theta ls/2) + Lbs/\{(n1/\sin(\theta ls/2))^2 - 1\}^{1/2}] \quad (26)$$

The F number of the condenser lens 3 is expressed as follows from the definition:

$$F = 1/\{2 \cdot \sin(\theta ls/2)\} \quad (27)$$

Therefore, rearranging the expression (25) by use of the expressions (26) and (27):

$$[x - dcg \cdot \{1-(1/n1)\}]/\{(2 \cdot F)^2 - 1\}^{1/2}/[(\tfrac{1}{2}) - 1/\{(2 \cdot n1 \cdot F)^2 - 1\}^{1/2}] < Lbs \quad (28)$$

The expression (28) is the limitation according to the condition (1).

The condition (2) is that the sum of distances in the air from the irradiation point 1a of the semiconductor laser 1 to the incidence surface 3a of the condenser lens 3 is positive, i.e. is expressed as:

$$x + y - dcg > 0 \quad (29)$$

Since the optical distance between the vertex of the exit surface 3b of the condenser lens 3 and the irradiation point 1a of the semiconductor laser 1 equals the focal length fco of the condenser lens 3, the following relationship holds:

$$fco=(x-dcg)+(dcg/n1)+(Lbs/n1)+y+(t/n2) \quad (30)$$

That is, $$x+y-dcg=fco-\{(dcg+Lbs)/n1\}-(t/n2) \quad (30')$$

Therefore, from the expressions (29) and (30'), the following expression is obtained:

$$Lbs<n1\cdot\{fco-(t/n2)\}-dcg \quad (31)$$

The expression (31) is the limitation according to the condition (2).

Therefore, the length Lbs of one side of the beam splitter 2 must be set at a value between the lower limit and the upper limit given by the expressions (28) and (31). In the actual design, it is desirable to reduce the length Lbs and the distance x as much as possible within the range.

With respect to specific values for the condition (1), in view of the distance from the irradiation point 1a to the cover glass 1b and the space necessary for focus adjustment, the distance x should be at least 2 mm. In this case, if the F number of the condenser lens 3 is reduced to approximately 1.2 in order to increase the effective luminous flux of the laser beam, the length Lbs is at least several millimeters.

With respect to the condition (2), when the focal length fco of the condenser lens 3 is 10 mm or more, it is substantially unnecessary to consider the upper limit of the length Lbs. When the focal length fco of the condenser lens 3 is short and the F number thereof is small, in some areas, the lower limit of the length Lbs determined by the condition (1) is greater than the upper limit of the length Lbs determined by the condition (2) so that arranging the optical system is impossible. However, such areas are outside generally possible ranges.

Figure 18:
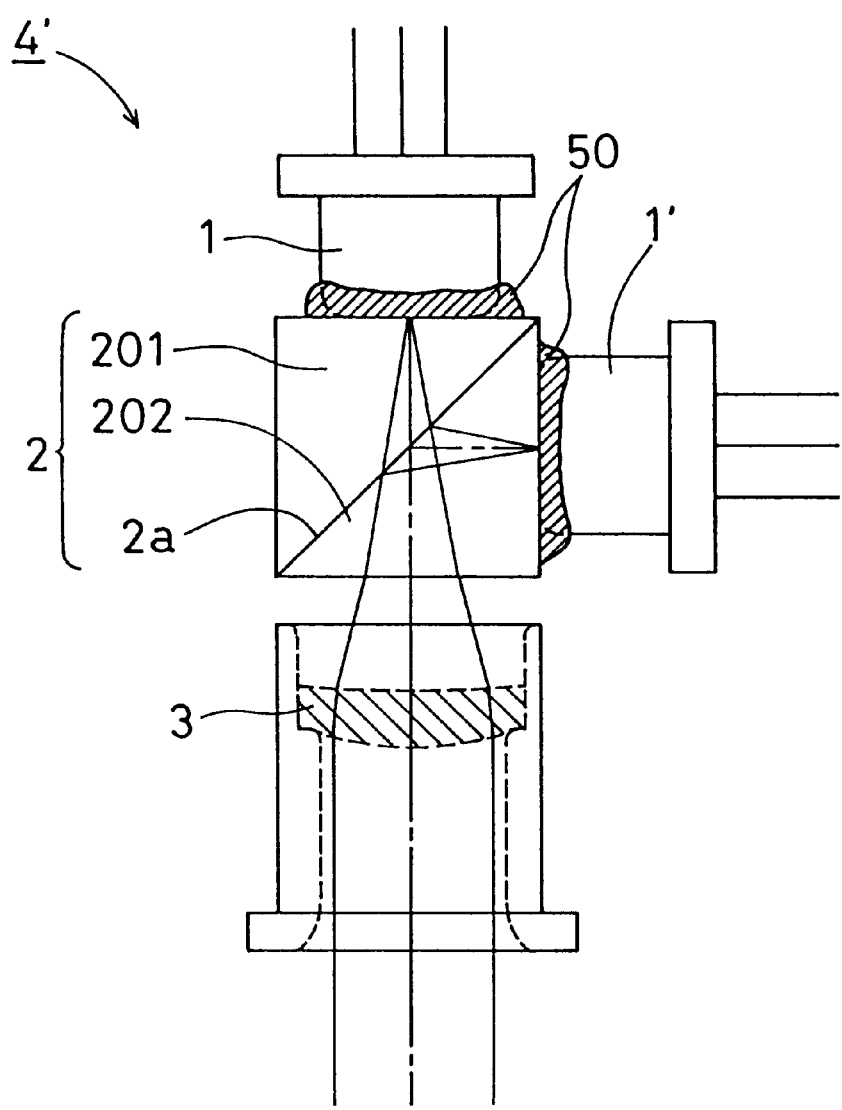
FIG. 18 shows a schematic arrangement of a laser light source apparatus according to a second embodiment of the present invention.

Next, a second embodiment of the present invention will be described. FIG. 18 shows a schematic arrangement of a laser light source apparatus 4' mounted in a multibeam scanning optical apparatus according to the second embodiment and comprising two semiconductor lasers 1 and 1', a beam splitter 2 and a condenser lens 3. The arrangement from the condenser lens 3 to the scanned surface is the same as that of the first embodiment shown in FIGS. 7 and 12.

While in FIG. 18, two laser beams irradiated from the semiconductor lasers 1 and 1' are depicted such that their optical axes coincide with each other after having exited from the beam splitter 2, in actuality, like in the first embodiment, the optical axes are two substantially parallel lines which are close to each other and the laser beams are imaged on the scanned surface into two spots with a predetermined distance therebetween in the sub scanning direction. Since it is therefore necessary for the optical axes of the two laser beams irradiated from the semiconductor lasers 1 and 1' to be substantially parallel to each other with a predetermined distance therebetween after the laser beams have exited from the beam splitter 2, the points where the optical axes intersect the interference film 2a of the beam splitter 2 slightly disagree within the sub scanning direction cross section.

In the second embodiment, like in the first embodiment, after directed in the same direction by the interference film 2a of the beam splitter 2, the two laser beams irradiated from the semiconductor lasers 1 and 1' are shaped into parallel luminous fluxes by the condenser lens 3. In the second embodiment, unlike in the first embodiment, the semiconductor lasers 1 and 1' are directly attached to two triangular prisms 201 and 202 constituting the beam splitter 2.

In the arrangement, one of the slanting surfaces of the triangular prisms 201 and 202, i.e. one of the cemented surfaces thereof is coated with the interference film 2a. The semiconductor lasers 1 and 1' are secured to one of the non-slanting surfaces of the triangular prisms 201 and 202 by use of an ultraviolet setting resin 50. At the time of the securing, as shown in FIGS. 19A and 19B, while the irradiation points of the semiconductor lasers 1 and 1' being viewed through a microscope 401, the triangular prisms 201 and 202 are slid in a direction I of FIG. 19A for focus adjustment, and the semiconductor laser 1' is slid in directions J and K of FIG. 19B to adjust the relative positions of the two semiconductor lasers 1 and 1'. When the adjustments are completed, ultraviolet light is irradiated to secure the elements.

In this embodiment, the semiconductor lasers 1 and 1' and the beam splitter 2 thus integrated are secured while being pressed against the housing 25 by use of a flat spring 51 and a screw 52.

When the laser light source apparatus 4' is arranged as described above, the only factor that causes the change of the relative positions of the semiconductor lasers 1 and 1' and the interference film 2a of the beam splitter 2 is the expansion of the beam splitter 2 due to the heat generated by the semiconductor lasers 1 and 1'. However, since the beam splitter 2 is made of optical glass and the change of its configuration due to a temperature change is extremely small, the shift amounts of the optical axes of the two laser beams irradiated from the semiconductor lasers 1 and 1' from the design optical axes of the laser beams are extremely small, so that the shift amounts of relative positions of the spots into which the two laser beams irradiated from the semiconductor lasers 1 and 1' are imaged on the scanned surface are extremely small. As a result, the images formed on the scanned surface are very stable.

In this arrangement, like in the first embodiment, since the laser light source apparatus includes fewer optical elements (specifically, fewer condenser lenses) than in the first prior art, the size of the laser light source apparatus is reduced and the cost is reduced.

Figure 20:
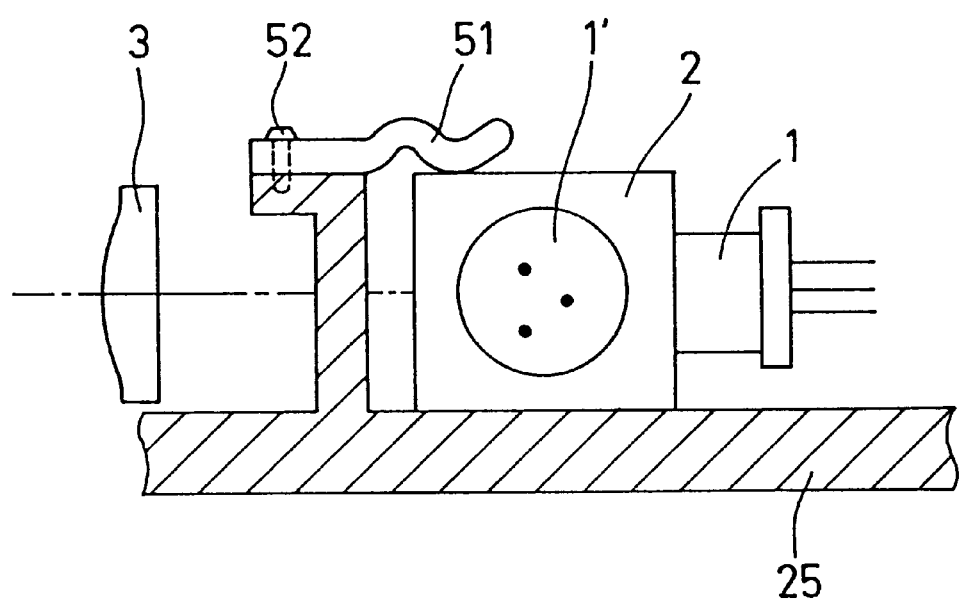
FIG. 20 shows the laser light source apparatus of FIG. 18 secured to a housing.

In this embodiment, while the semiconductor lasers 1 and 1' and the beam splitter 2 are integrated, the beam splitter 2 and the condenser lens 3 (FIG. 20 does not show the lens barrel holding the condenser lens 3) are not integrated in order to facilitate the adjustment of the optical elements disposed behind the condenser lens 3. However, the semiconductor lasers 1 and 1', the beam splitter 2 and the condenser lens 3 may be integrated after their relative positions have been adjusted like in the first embodiment. In that case, optical adjustment is easily made when the multibeam scanning optical apparatus having the laser light source apparatus 4 mounted therein is assembled, or when it is disassembled and re-assembled at the time of maintenance.

While a cube-type beam splitter comprising two cemented triangular prisms is used as the beam splitter 2 in the above-described embodiments, a plate-form half mirror may be used instead, to make the apparatus more simple. In that case, the expression (24) with a value of 40000 for the constant C holds as well.

Obviously, many modifications and variations of the present invention are possible in light of the above teachings. It is therefore to be understood that within the scope of the appended claims, the invention may be practiced other than as specifically described.

What is claimed is:

1. A scanning optical apparatus comprising:

a first light source for irradiating a first luminous flux;

a second light source for irradiating a second luminous flux;

a beam splitter for transmitting said first luminous flux and reflecting said second luminous flux so that the first and second luminous fluxes exit from the beam splitter substantially in a same direction;

a condenser lens for shaping said first and second luminous fluxes having exited from said beam splitter;

a deflector for deflecting said first and second luminous fluxes having exited from said condenser lens; and a scanning optical system for imaging said first and second luminous fluxes on a scanned surface, wherein said scanning optical apparatus fulfills the following condition:

$$d \cdot \beta \cdot Pi < 40000$$

where:

d is an optical path length (unit: mm) of said second luminous flux from an irradiation point of the second light source to a reflection point of the beam splitter;

$\beta$ is an overall magnification of the optical system from the irradiation point of the second light source to the scanned surface; and Pi is a density (unit: dot/inch) of a luminous flux imaged on the scanned surface.

2. A scanning optical apparatus as claimed in claim 1, wherein an optical axis of said first luminous flux and an optical axis of said second luminous flux are substantially parallel to each other so as to be separated from each other in a sub scanning direction, said sub scanning direction being perpendicular to a main scanning direction in which said deflector deflects the luminous fluxes.

3. A scanning optical apparatus as claimed in claim 1, wherein said first luminous flux irradiated from the first light source is incident on the beam splitter from a sub scanning direction.

4. A scanning optical apparatus as claimed in claim 1, wherein said first and second luminous fluxes irradiated from the first and second light sources are both incident on the beams splitter from within a main scanning plane.

5. A scanning optical apparatus as claimed in claim 1, wherein said first and second light sources are semiconductor laser devices.

6. A scanning optical apparatus as claimed in claim 5, wherein said beam splitter is a cube-type beam splitter comprising two cemented prisms where cemented surfaces thereof serve as a reflecting surface, and wherein said semiconductor laser devices which are the first and second light sources are directly secured to incidence surfaces of the beam splitter so as to be in contact therewith.

7. A scanning optical apparatus as claimed in claim 5, wherein said beam splitter is a cube-type beam splitter comprising two cemented prisms where cemented surfaces thereof serve as a reflecting surface, said beam splitter fulfilling the following condition:

$$Lbs < n1 \cdot \{fco - (t/n2)\} - dcg$$

where:

Lbs is a length of one side of the cube-type beam splitter;

n1 is a refractive index of a cover glass of the semiconductor laser device and the cube-type beam splitter;

n2 is a refractive index of the condenser lens;

fco is a focal length of the condenser lens;

t is an axial thickness of the condenser lens; and dcg is a thickness of the cover glass of the semiconductor laser device.

8. A scanning optical apparatus as claimed in claim 1, wherein said beam splitter is a polarization beam splitter.

9. A scanning optical apparatus as claimed in claim 1, wherein said first and second light sources, said beam splitter and a lens barrel holding said condenser lens are held on a same holding member.

10. A scanning optical apparatus comprising:

a first semiconductor laser device;

a second semiconductor laser device;

a photoreceptor drum;

a cube-type beam splitter comprising two cemented triangular prisms, said beam splitter transmitting a laser beam irradiated from said first semiconductor laser device and reflecting a laser beam irradiated from said second semiconductor laser device so that the laser beams exit from the beam splitter substantially in a same direction;

a condenser lens for shaping the laser beams having exited from said beam splitter;

a polygonal mirror for deflecting the laser beams having exited from said condenser lens; and a scanning optical system for imaging the laser beams deflected by said polygonal mirror on a scanned surface on the photoreceptor drum, wherein said scanning optical apparatus fulfills the following condition:

$$d \cdot \beta \cdot Pi < 40000$$

where:

d is an optical path length (unit: mm) from an irradiation point of the second semiconductor laser device to a reflection point of the beam splitter;

$\beta$ is an overall magnification of the optical system from the irradiation point of the second semiconductor laser device to the scanned surface on the photoreceptor drum; and Pi is a density (unit: dot/inch) of a luminous flux imaged on the scanned surface on the photoreceptor drum.

11. A scanning optical apparatus as claimed in claim 10, wherein an optical axis of the laser beam irradiated from said first semiconductor laser device and an optical axis of the laser beam irradiated from said second semiconductor laser device are substantially parallel to each other so as to be separated from each other in a sub scanning direction, said sub scanning direction being perpendicular to a main scanning direction in which said polygonal mirror deflects the laser beams.

12. A scanning optical apparatus as claimed in claim 10, wherein said laser beam irradiated from the first semiconductor laser device is incident on the beam splitter from a sub scanning direction, said sub scanning direction being perpendicular to a main scanning direction in which said polygonal mirror deflects the laser beam.

13. A scanning optical apparatus as claimed in claim 10, wherein said laser beams irradiated from the first and second semiconductor laser devices are both incident on the beam splitter from within a main scanning plane.

14. A scanning optical apparatus as claimed in claim 10, wherein said first and second semiconductor laser devices, said beam splitter and a lens barrel holding said condenser lens are held on a same holding member.

15. An optical scanning method comprising:
- a step in which a first light source irradiates a first luminous flux and a second light source irradiates a second luminous flux;
- a step in which a beam splitter transmits said first luminous flux and reflects said second luminous flux so that the first and second luminous fluxes exit from the beam splitter substantially in a same direction;
- a step in which a condenser lens shapes said first and second luminous fluxes having exited from said beam splitter;
- a step in which a deflector deflects said first and second luminous fluxes having exited from said condenser lens;
- and a step in which a scanning optical system images said first and second luminous fluxes on a scanned surface, wherein said optical scanning method fulfills the following condition:

$$d \cdot \beta Pi < 40000$$

where:

- d is an optical path length (unit: mm) from an irradiation point of the second light source to a reflection point of the beam splitter;
- $\beta$ is an overall magnification of the optical system from the irradiation point of the second light source to the scanned surface; and
- Pi is a density (unit: dot/inch) of a luminous flux imaged on the scanned surface.

* * * * *